US012165179B2

(12) United States Patent
Chopra et al.

(10) Patent No.: US 12,165,179 B2
(45) Date of Patent: Dec. 10, 2024

(54) MULTI-CHANNEL FEEDBACK ANALYTICS FOR PRESENTATION GENERATION

(71) Applicant: TREDENCE INC., San Jose, CA (US)

(72) Inventors: Ankush Chopra, Karnataka (IN); Aravind Chandramouli, Karnataka (IN); Ashutosh Rajesh Kothiwala, Gujarat (IN); Shiven Purohit, Rajasthan (IN); Siddharth Shukla, Delhi (IN); Shubham Pandey, Uttarakhand (IN); Soumendra Mohanty, Karnataka (IN)

(73) Assignee: TREDENCE INC., San Jose, CA (US)

( * ) Notice: Subject to any disclaimer, the term of this patent is extended or adjusted under 35 U.S.C. 154(b) by 321 days.

(21) Appl. No.: 17/692,934

(22) Filed: Mar. 11, 2022

(65) Prior Publication Data

US 2023/0289854 A1    Sep. 14, 2023

(51) Int. Cl.
| | |
|---|---|
| *G06Q 30/0282* | (2023.01) |
| *G06F 40/289* | (2020.01) |
| *G06F 40/30* | (2020.01) |
| *G06Q 10/0639* | (2023.01) |
| *G06Q 30/0203* | (2023.01) |

(52) U.S. Cl.
CPC ....... *G06Q 30/0282* (2013.01); *G06F 40/289* (2020.01); *G06F 40/30* (2020.01); *G06Q 30/0203* (2013.01); *G06Q 10/06393* (2013.01)

(58) Field of Classification Search
CPC .... G06Q 30/02; G06Q 30/0282; G06F 40/30; G06F 40/289; G06F 40/253
See application file for complete search history.

(56) References Cited

U.S. PATENT DOCUMENTS

| | | | | |
|---|---|---|---|---|
| 9,336,268 | B1* | 5/2016 | Moudy | .............. G06F 17/30 |
| 2015/0074698 | A1* | 3/2015 | Pinto | ............... H04N 21/475 |
| | | | | 725/14 |
| 2017/0004205 | A1* | 1/2017 | Jain | ................... G06F 17/30 |
| 2018/0150455 | A1* | 5/2018 | Hu | ....................... G06F 17/27 |
| 2019/0311301 | A1* | 10/2019 | Pyati | .................. G06N 99/00 |

OTHER PUBLICATIONS

U.S. Appl. No. 17/692,911, titled "Multi-Channel Feedback Analytics for Presentation Generation", filed Mar. 11, 2022.
U.S. Appl. No. 17/692,961, titled "Multi-Channel Feedback Analytics for Presentation Generation", filed Mar. 11, 2022.

* cited by examiner

*Primary Examiner* — Richemond Dorvil
*Assistant Examiner* — Ethan Daniel Kim
(74) *Attorney, Agent, or Firm* — Kilpatrick Townsend & Stockton LLP

(57) ABSTRACT

An analytics system receives, from a client computing device, a request to generate a presentation. The analytics system accesses one or more feedback datasets of feedback data. The feedback data comprises unstructured data available from multiple data stores. The analytics system generates, for each feedback dataset, a respective feedback text and a respective sentiment score indicating a degree of negativity associated with the respective feedback text. For a combination of a plurality of generated feedback texts, the analytics system selects a set of themes based at least on a plurality of generated sentiment scores. Each sentiment score of the plurality of generated sentiment scores is associated with one of the plurality of generated feedback texts. The analytics system generates a presentation file that indicates the set of themes. The analytics system causes the presentation file to be transmitted to the client computing device.

15 Claims, 13 Drawing Sheets

MULTI-CHANNEL FEEDBACK ANALYTICS FOR PRESENTATION GENERATION

TECHNICAL FIELD

This disclosure generally relates to intelligent summarization of feedback. More specifically, but not by way of limitation, this disclosure relates to intelligent and dynamic summarization and presentation of multi-channel feedback.

BACKGROUND

Customer analytics systems can collect and summarize reviews for entities (e.g. businesses, agencies, attractions, or other entities). Conventionally, reviews are given through review sites, however, with increased use of microblogging and social media, customers have started giving feedback data to the companies directly through a variety of additional channels, including through surveys, emails, chat, social media posts, phone call assistants, and virtual assistants. These solicited and unsolicited feedback data are great source of information on things that customers like and dislike about the product they have received, service that have received, or other experience. However, the increase in the use of these channels has increased the quantum of feedback information for entities by many folds, which makes it difficult for the entities to use this rich source of data effectively.

Given the large amount of feedback data from variety of channels, where each channel generally has feedback data in a format specific to the channel (e.g. a survey format is vastly different from a social media post format, an online review format, and an interactive chat format, etc.), existing analytics tools are unable to process and summarize such a variety of feedback data in a unified manner or with objectivity. Therefore, conventional analytics systems may be unable to provide an accurate summary of entity feedback data when feedback data is received across multiple source channels.

Also, conventional analytics systems may analyze a set of reviews and determine items such as a set of frequently asked questions, a set of themes, or a set of keywords, but conventional analytics systems are unable to summarize data across multiple types of items determined from the set of reviews as dimensions of comparison (e.g. determining a set of frequently asked questions for each of a set of themes). Further, conventional analytics systems may use multiple tools (one per item or dimension), in a sequential manner, where one tool may build on the top of the output of a previous tool, or in parallel, where an aggregation tool may combine the results at the end. Although the parallel processing architecture approach can be faster than the sequential approach, either conventional processing architecture can result in a large processing latency.

SUMMARY

The present disclosure describes techniques for an analytics system to generate a presentation based on feedback data associated with an entity.

In certain embodiments, the analytics system receives, from a client computing device, a request to generate a presentation for an entity, the request indicating a presentation template to present one or more combinations of theme information, actionable insights information, and question information. The analytics system accesses feedback data associated with the entity, the feedback data comprising unstructured data available from multiple data stores. The analytics system determines analytical data that indicates themes, actionable insights, and questions generated from the feedback data. The analytics system generates a presentation file based on the analytical data, wherein the presentation file includes one or more combinations of the themes, actionable insights, and questions according to the presentation template. The analytics system causes the presentation file to be transmitted to the client computing device.

In certain embodiments, the analytics system receives, from a client computing device, a request to generate a presentation. The analytics system accesses one or more feedback datasets of feedback data, wherein the feedback data comprises unstructured data available from multiple data stores. The analytics system generates, for each feedback dataset, a respective feedback text and a respective sentiment score indicating a degree of negativity associated with the respective feedback text. For a combination of a plurality of generated feedback texts, the analytics system selects a set of themes based at least on a plurality of generated sentiment scores, wherein each sentiment score of the plurality of generated sentiment scores is associated with one of the plurality of generated feedback texts. The analytics system generates a presentation file that indicates the set of themes. The analytics system causes the presentation file to be transmitted to the client computing device.

In certain embodiments, the analytics system receives, from a client computing device, a request to generate a presentation. The analytics system accesses one or more feedback datasets of feedback data, wherein the feedback data comprises unstructured data available from multiple data stores. The analytics system generates, for each feedback dataset, a respective feedback text and a respective sentiment associated with the respective feedback text. The analytics system applies a model to a plurality of generated feedback texts to extract actionable insights, wherein the actionable insights comprise portions of feedback texts that are (1) associated with items associated with an entity and (2) include a negative sentiment. The analytics system generates a presentation file that indicates the actionable insights. The analytics system causes the presentation file to be transmitted to the client computing device.

Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
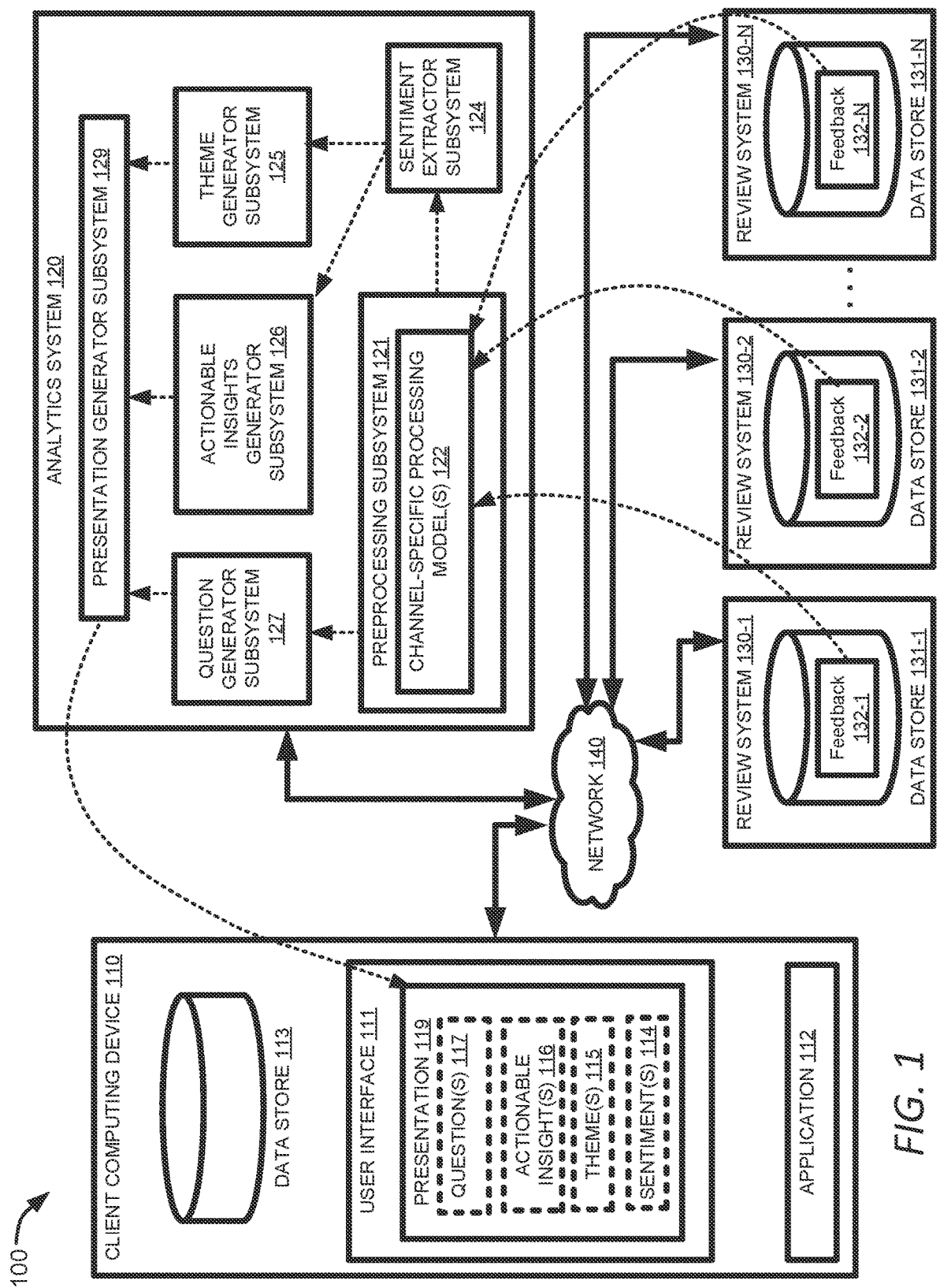
FIG. 1 depicts an example of a computing environment for generating a presentation for an entity that includes one or more combinations of themes, actionable insights, and questions determined from feedback data, according to certain embodiments disclosed herein.

In the following description, for the purposes of explanation, specific details are set forth in order to provide a thorough understanding of certain embodiments. However, it will be apparent that various embodiments may be practiced without these specific details. The figures and description are not intended to be restrictive. The words "exemplary" or "example" are used herein to mean "serving as an example, instance, or illustration." Any embodiment or design described herein as "exemplary" or "example" is not necessarily to be construed as preferred or advantageous over other embodiments or designs.

With reference to the embodiments described herein, a computing environment may include an analytics system, which is a computing device configured to interact with various review systems to access feedback data and with a client computing device to receive a request for a presentation regarding an entity and to which to transmit the presentation. The recommendation system may be configured to generate a presentation, which include predefined combinations of themes, actionable insights, and questions determined from multiple channels of feedback data received from multiple data stores.

The following non-limiting example is provided to introduce certain embodiments. In this example, an analytics system receives feedback data for an entity (e.g. a merchant system or other entity) aggregated from data stores of one or more feedback sources (e.g. social media systems, review systems, merchant system websites, or other sources). The aggregated feedback data include multiple channels of feedback data (e.g. social media posts, telephone transcripts, interactive chats, reviews, surveys, etc.). The aggregated feedback data is unstructured as the multiple channels of feedback do not share a common format or data structure. For example, a format of a survey (e.g. a serious of questions with freeform and/or selected multiple choice answers) can be vastly different from a format of a social media post (e.g. free text), a review (e.g. free text and a selected rating), and a chat message exchange (e.g. a series of texts exchanged between a user and an agent). The analytics system determines analytical data including sentiments, themes, actionable insights, questions, and/or other analytical data from the unstructured, aggregated feedback data for the entity. Determining the analytical data can include preprocessing the unstructured feedback data to generate feedback texts from which the analytical data can be extracted or otherwise determined by specific processes. The analytics system can apply a question extraction process to the feedback texts to determine a set of questions. The analytics system can apply a sentiment extraction process to the generated feedback texts to determine a sentiment for each of the feedback texts. A theme generation process and actionable insights generation process can determine, respectively, themes and actionable insights from the feedback texts based at least in part on an output of the sentiment extraction process. The analytics system can generate a presentation file (e.g. a slide presentation, a multi-page PDF, or other format) that presents multiple views including specific predefined combinations of one or more of the sentiments, themes, actionable insights, and/or questions and cause the presentation file to be transmitted to the client computing device.

The analytics system that generates a presentation of analytical data determined for an entity based on unstructured feedback data from multiple channels, as described herein, provides several improvements and benefits over conventional techniques. Certain embodiments described herein address the limitations of conventional analytics systems by providing dynamic presentations of combinations of key analytical data determined from feedback data received via multiple channels, for modifying computing environments or other systems on the fly. For example, the presentation generation processes described herein automatically create, from multi-channel feedback data, an executive presentation by presenting specific combinations of data output by particular processing modules (e.g. themes, actionable insights, questions, sentiments, etc.). Such specific combinations of data in the dynamic presentation provides a superior analysis of feedback data that highlights, for the subject entity, areas of concern and potential for change, which is not provided by outputs of conventional analytics systems. Also, the channel-specific feedback data preprocessing described herein increase an accuracy of analytical data determined from entity feedback data by enabling accurate processing of feedback data received across multiple source channels in a variety of formats, which conventional analytics systems do not provide. Specifically, the preprocessing outputs described herein, though conducted on input feedback data of diverse channels, can be of a similar syntactic and semantic nature, which makes it easier to detect and combine similar analytical data together when using clustering and other aggregation methods to come up with homogeneous analytical data clusters. Also, the feedback data processing operations describe herein provides a single, accurate, integrated tool, whereas conventional systems require using multiple tools to analyze feedback, which may be less accurate.

Further, the specific order of the feedback data processing operations described herein, which are performed via two initial sequential processes (preprocessing and sentiment processing) followed by three processes in parallel (themes processing, actionable insights processing, and questions processing), where the preprocessing output is re-used for the questions processing and the sentiments processing output is re-used for the themes processing and actionable insights processing, significantly reduce the processing latency (e.g., by at least an order of magnitude) compared to conventional analytics systems.

Example Operating Environment for Generating a Presentation for an Entity that Includes One or More Combinations of Themes, Actionable Insights, and Questions Determined from Feedback Data.

Referring now to the drawings, FIG. 1 depicts an example of a computing environment 100 for generating a presentation for an entity that includes one or more combinations of themes, actionable insights, and questions determined from feedback data, in accordance with certain embodiments described herein. The computing environment 100 includes an analytics system 120, which can include one or more processing devices that execute a one or more subsystems, including a preprocessing subsystem 121, a sentiment extractor subsystem 124, a theme generator subsystem 125, an actionable insights generator subsystem 126, a question generator subsystem 127, and a presentation generator subsystem 129. In certain embodiments, the analytics system 120 is a network server or other computing device connected to a network 140.

The analytics system 120 (including a preprocessing subsystem 121, a sentiment extractor subsystem 124, a theme generator subsystem 125, an actionable insights generator subsystem 126, a question generator subsystem 127, and a presentation generator subsystem 129) may be implemented using software (e.g., code, instructions, program) executed by one or more processing units (e.g., processors, cores), hardware, or combinations thereof. The software may be stored on a non-transitory storage medium (e.g., on a memory device). The computing environment 100 depicted in FIG. 1 is merely an example and is not intended to unduly limit the scope of claimed embodiments. One of the ordinary skill in the art would recognize many possible variations, alternatives, and modifications. For example, in some implementations, the analytics system 120 (including the preprocessing subsystem 121, the sentiment extractor subsystem 124, the theme generator subsystem 125, the actionable insights generator subsystem 126, the question generator subsystem 127, and the presentation generator subsystem 129) can be implemented using more or fewer systems or subsystems than those shown in FIG. 1, may combine two or more subsystems, or may have a different configuration or arrangement of the systems or subsystems. In some instances, the analytics system 120 provides a service that processes feedback data 132 for an entity and generates an executive presentation 119 that summarizes and highlights specific combinations of key data from the feedback data 132 to customers.

The client computing system 110, in certain embodiments, includes a user interface 111, an application 112, and a data store 113 (e.g. a data storage unit). An operator of the client computing system 110 may be a customer of the analytics system 120. The operator may download the application 112 to the client computing system 110 via a network 140. The application 112, in some instances, is an feedback analytics presentation application, which communicates with the analytics system 120 via the network 140. In some instances, the analytics system 120 may provide the application 112 for download via the network 140, for example, directly via a website of the analytics system 120 or via a third party system (e.g. an application store service system). The client computing device 110, in certain embodiments, is configured to transmit a request, to the analytics system 120, for a presentation 119 to illustrate or otherwise present analytics data associated with an entity. The client computing device 110 can receive, from the analytics system 120 via the network 140, a presentation 119 generated by the analytics system 120.

The analytics system 120 is configured access feedback 132 data or otherwise receive the feedback 132 data (feedback 132-1, 132-2, . . . , 132-N) from one or more review systems 130 (e.g. review systems 130-1, 130-2, . . . , 130-N). In other instances, the feedback 132 data is received from a single review system 130. The feedback 132 data could include user reviews, commentary, social media posts, interactive chat transcripts, call transcripts, surveys, or other information describing an entity (e.g. a merchant or other service system) or products/services provided by the entity. The analytics system 120 can determine, based on the received feedback 132 data, analytical data for the entity including a sentiment 114 associated with each feedback 132 data and themes 115, actionable insights 116, and questions 117 associated with the feedback 132 data. The analytics system 120 can generate a presentation 119 based on one or more of the analytics data determined for the entity. The presentation can include a graphical user interface that presents one or more specific, preconfigured combinations of analytical data for the entity. The graphical user interface that presents the analytical data can be automatically updated to present subsequent analytical data responsive to receiving a subsequent feedback 132 data associated with the entity or in response to one or more changes in the feedback 132 data.

The presentation generator subsystem 129 is configured to generate, for the feedback 132 and based on analytics data (e.g. sentiments 114, themes 115, actionable insights 116, and questions 117) determined by the analytics system 120 (e.g. determined by subsystems 124, 125, 126, and 127, respectively), a presentation 119 including one or more of the analytics data for the entity. In some instances the presentation generator subsystem 128 is configured to receive a request for the presentation 119 for the entity from a client computing device 110 via a network 140 and to transmit the presentation 119 to the client computing device 110 responsive to receiving the request. Additional details about generating a presentation 119 are provided below with respect to FIG. 2, and example illustrations of views provided in an example presentation 119 are provided below with respect to FIG. 3, FIG. 4, and FIG. 5.

In certain embodiments, the preprocessing subsystem 121 applies channel-specific processing models 122 to a feedback 132 data (132-1, 132-2, . . . 132-N) for an entity received from data stores (e.g. 131-1, 131-2, . . . 131-N) of multiple review systems (e.g. 130-1, 130-2, . . . , 130-N) to generate a feedback text associated with each feedback of the feedback 132 data. In certain instances, the feedback 132 data comprises feedback from a single channel, for example, all of the feedback of the feedback 132 data includes social media posts. In other instances, the feedback 132 data includes feedback from multiple channels. For example, the feedback 132 data could include a mixture of social media posts, surveys, e-mail messages, or other types of feedback 132 data. Feedback 132 data received from specific channels (e.g. feedback types) may have channel-specific noise which is cleaned by the preprocessing subsystem 121 before further processing. In some instances, each of the review systems 130 may be associated with a specific channel (e.g. a specific type of review), for example, channels may include social media posts, telephone reviews, messaging system exchanges, review forms, or other types of feedback 132. For example, the preprocessing subsystem 121 may apply a social media channel-specific preprocessing model 122 to process feedback 132 data comprising a social media post received from a social media review system 130-1. the preprocessing subsystem 121 may apply a telephone call channel preprocessing model 122, a chat channel preprocessing model 122, an e-mail channel preprocessing model 122, and a survey channel preprocessing model 122 to process feedback 132 data comprising a call transcript, a chat message exchange, an e-mail message, and a survey, respectively. Other preprocessing models 122 may be used in addition to or instead of these example preprocessing models 122.

In some instances, the sentiment extractor subsystem 124 is configured to determine a sentiment 114 for each feedback (e.g. 132-1, 132-2, . . . , 132-N) of the feedback 132 data based on a feedback text output for the feedback 132 by the preprocessing subsystem 121. The theme generator subsystem 125 is configured to determine a set of themes 115 for the feedback 132 based at least in part on the sentiment 114 associated with each feedback as determined by the sentiment extractor subsystem 124. Additional details about a sentiment extraction process are provided below with respect to FIG. 9.

The theme generator subsystem 125 is configured to determine themes 115 for the feedback 132 data based at least in part on the sentiment 114 associated with each feedback of the feedback 132 data as determined by the sentiment extractor subsystem 124. Additional details about generating themes from feedback 132 data are provided below with respect to FIG. 6.

The actionable insights generator subsystem 126 is configured to determine actionable insights 116 for the feedback 132 based at least in part on the sentiment 114 associated with each feedback as determined by the sentiment extractor subsystem 124. In certain embodiments, actionable insights 116 include portions of feedback 132 texts that are associated with items (e.g. products, services, business name, marks, etc.) associated with an entity and include a negative sentiment (e.g. as determined by the sentiment extractor subsystem 124). Additional details about generating actionable insights from feedback 132 data are provided below with respect to FIG. 7 and FIG. 8.

The questions generator subsystem 127 is configured to determine, for the feedback 132 data, a set of questions 117. Additional details about determining a set of questions from feedback 132 data are provided below with respect to FIG. 10.

In certain examples, the various subsystems (e.g. subsystems 121, 124, 125, 126, 127, and 129) of the analytics system 120 can be implemented as one or more of program code, program code executed by processing hardware (e.g., a programmable logic array, a field-programmable gate array, etc.), firmware, or some combination thereof.

Examples of Computer-Implemented Operations for Generating a Presentation for an Entity that Includes One or More Combinations of Themes, Actionable Insights, and Questions Determined from Feedback Data.

Figure 2:
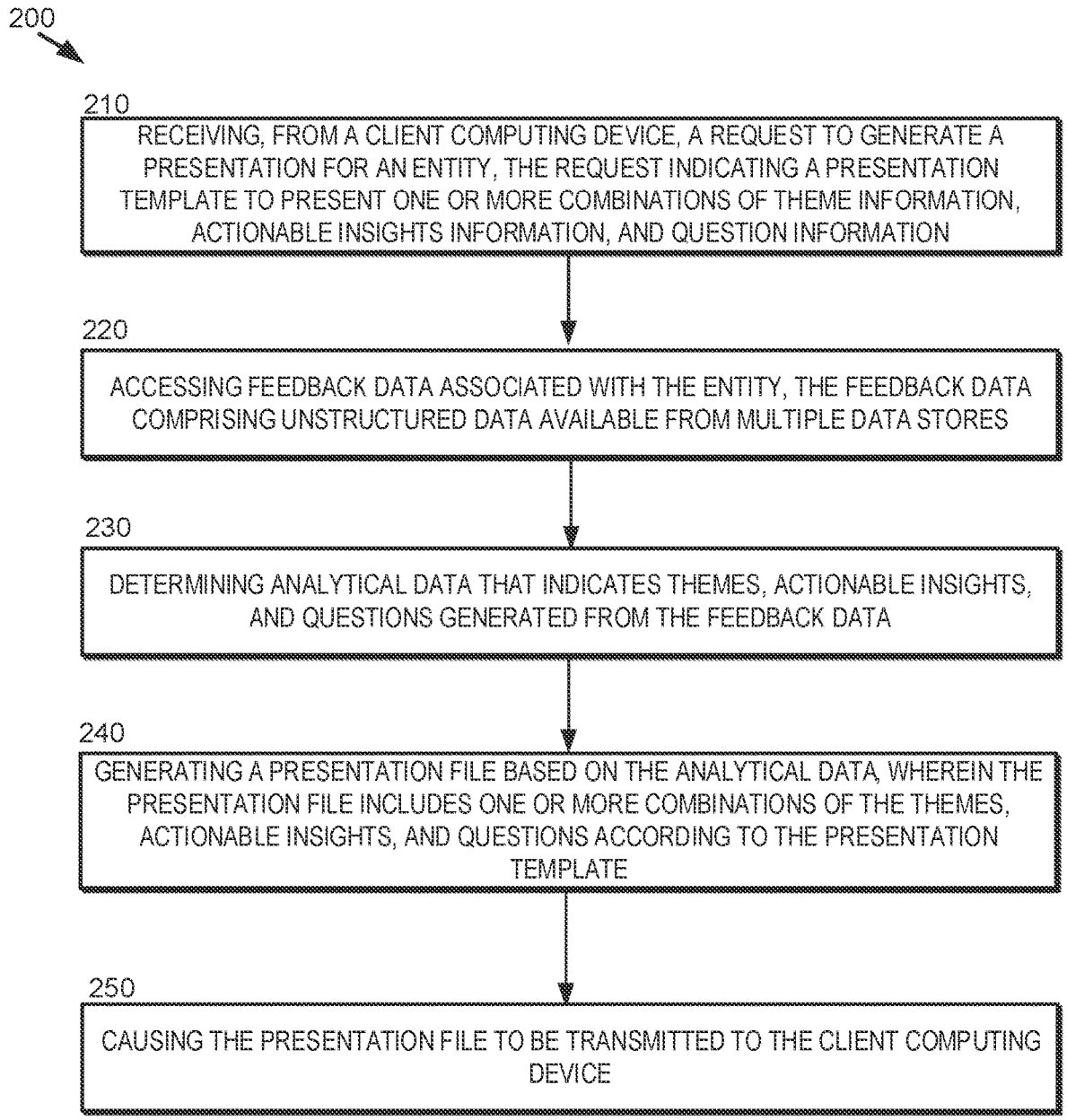
FIG. 2 depicts an example of a method for generating a presentation for an entity that includes one or more combinations of themes, actionable insights, and questions determined from feedback data, according to certain embodiments disclosed herein.

FIG. 2 depicts an example of a method 200 for generating a presentation 119 for an entity that includes one or more combinations of themes 115, actionable insights 116, and questions 117 determined from feedback data 132. One or more computing devices (e.g., the analytics system 120 or the individual subsystems contained therein) implement operations depicted in FIG. 2. For illustrative purposes, the process 200 is described with reference to certain examples depicted in the figures. Other implementations, however, are possible.

Figure 3:
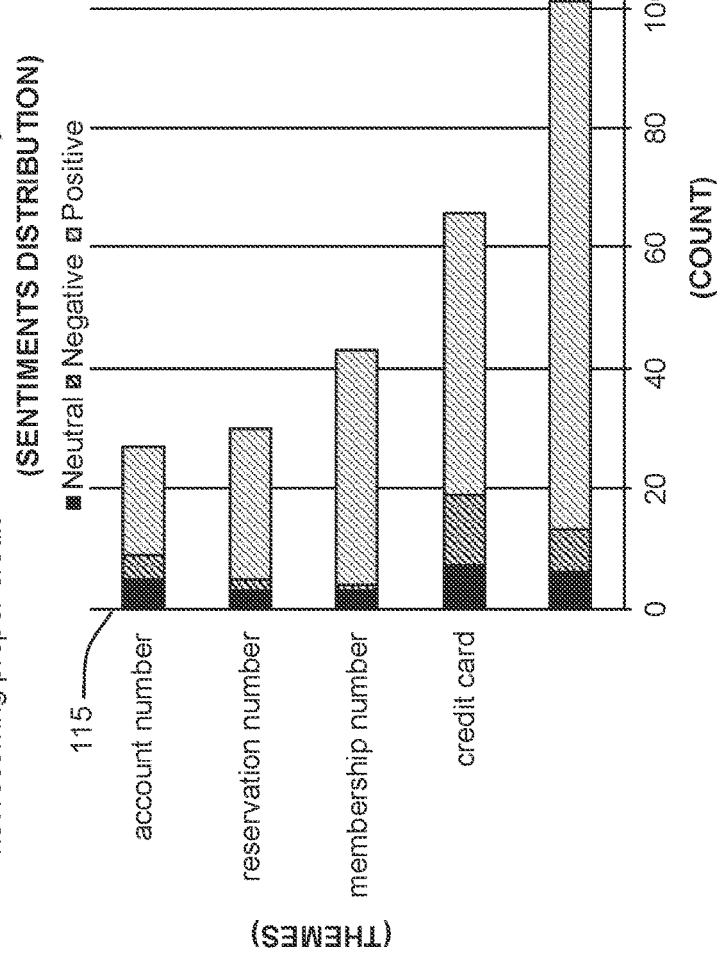
FIG. 3 depicts an illustration of a theme sentiment view in a presentation generated according to the method of FIG. 2, according to certain embodiments disclosed herein.
Figure 3:
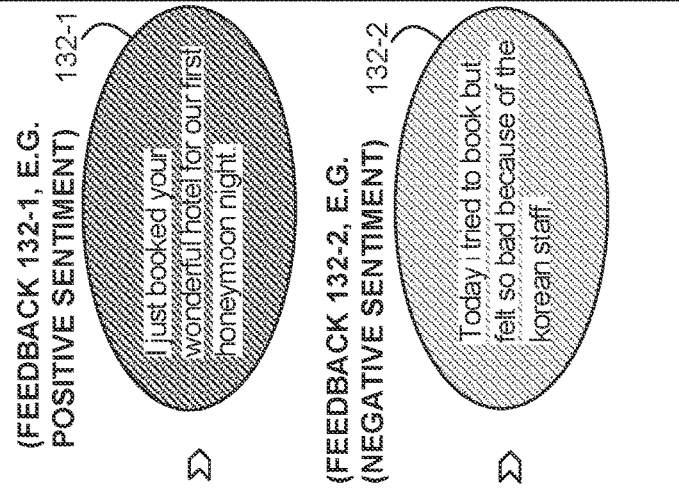
Figure 4:
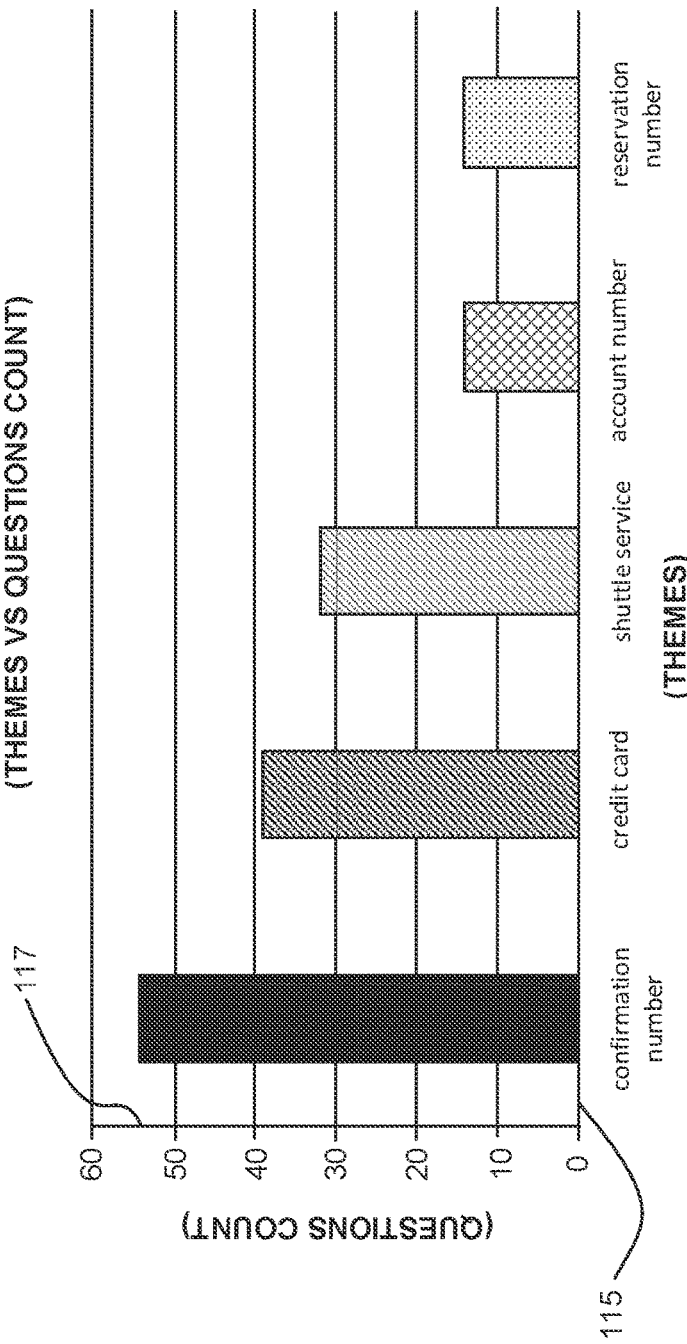
FIG. 4 depicts an illustration of a theme question view in a presentation generated according to the method of FIG. 2, according to certain embodiments disclosed herein.
Figure 5:
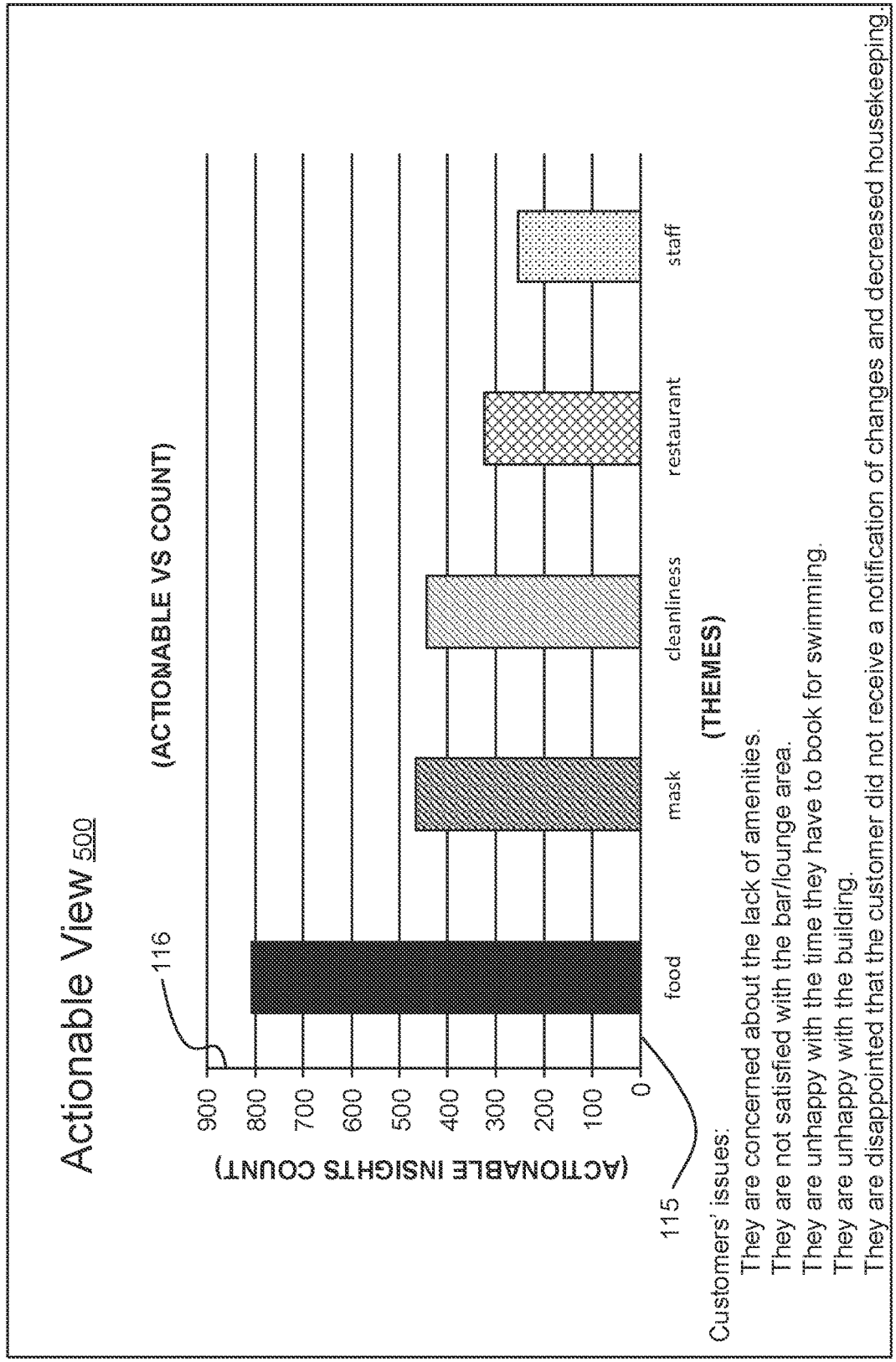
FIG. 5 depicts an illustration of an actionable view in a presentation generated according to the method of FIG. 2, according to certain embodiments disclosed herein.

At block 210, the method 200 involves receiving, by an analytics system 120 from a client computing device 110, a request to generate a presentation 119 for an entity, the request indicating a presentation template to present one or more combinations of theme 115 information, actionable insights 116 information, and question 117 information. In certain examples, the presentation template also presents one or more combinations of analytical data including sentiments 114 information, theme 115 information, actionable insights 116 information, and question 117 information. In some instances, the analytical data also includes customer complaints and the one or more combinations may also include the customer complaints. The client computing device 110 may be associated with a customer of the analytics system and the entity may be a business, a non-profit agency, a government institution, a geographic location, a city, or other entity. In some instances, the customer is the entity for which presentation 119 is requested. The presentation template could define a presentation file type, for example, a portable document format ("PDF"), a slide show format (e.g. a Microsoft PowerPoint® presentation). The presentation template is able to provide multiple views or sections (e.g. one view per slide, page, or other section of the template), where each view or section presents a respective predefined combination of one or more of the analytical data. The presentation template defines, for each view or section, a number of and/or manner in which to incorporate the sentiments 114, themes 115, actionable insights 116, and questions 117 within the respective combination for the section. Certain views or sections may present the respective predefined combination of the one or more of the analytical data in a graphical format (e.g. in one or more charts, graphs, lists, callouts, videos, popups, other user interface objects, or other graphical and/or interactive items). Examples of views provided in a presentation 119 generated via a presentation template are illustrated in FIG. 3, FIG. 4, and FIG. 5.

At block 220, the method 200 involves accessing, by the analytics system 120, feedback data 132 comprising unstructured data available from multiple data stores 131. For example, the analytics system 120 accesses available feedback data 132 associated with the entity specified in the request for a presentation 119 received from the client computing device 110. The analytics system 120 accesses feedback 132 data or otherwise receives the feedback 132 data (feedback 132-1, 132-2, . . . , 132-N) from one or more data stores 131 (e.g. data stores 131-1, 131-2, . . . , 131-N) of review systems 130 (e.g. review systems 130-1, 130-2, . . . , 130-N). In other instances, the feedback 132 data is received from one or more data stores 131 of a single review system 130. The feedback 132 data could include user reviews, commentary, social media posts, interactive chat transcripts, call transcripts, surveys, or other information describing the entity or products/services provided by the entity.

At block 230, the method 200 involves determining, by the analytics system 120 analytical data that indicates themes 115, actionable insights 116, and questions 117 generated from the feedback 132 data. Example processes to determine themes 115, actionable insights 116, and questions 117 are described herein, respectively, in FIG. 6, FIGS. 7-8, and FIG. 10. Themes 115 can include key concepts of a feedback text. Actionable insights 116 can include one or more issues with products, services, or other items offered for sale by or otherwise associated with the entity which the entity can improve or otherwise address by taking action. For example, for a feedback text that states "it is not for anything i would ever use. you all should maybe quit trying to take advantage of people's fears by trying to force this home delivery nonsense on me," the analytics system 120 may determine an actionable insight 116 that states "They are trying to promote the home delivery nonsense." In this example, the actionable insight 116 identifies promoting home delivery as an area that the entity may consider changing or otherwise addressing. Questions 117 can include questions detected in feedback texts, which can be clustered or otherwise grouped based on similarity.

The analytical data can also indicate sentiments 114 associated with the feedback 132 data. A sentiment 114 can include a classification (e.g. positive, negative, and/or neutral) and/or a value (e.g. a degree or value on a scale or range of negativity, a degree or value on a scale or range of positivity). For example, a sentiment 114 could be "positive" or could be 0.9 on a scale of 0 (indicating completely positive sentiment) to 1 (indicating completely negative sentiment). In some instances, each sentiment 114 can be associated with and determined from a feedback text generated by the preprocessing subsystem 121. Example processes to determine sentiments 114 from feedback 132 data are described herein in FIG. 9.

In some instances, the analytical data can also indicate complaints associated with the feedback 132 data. A complaint (e.g. a grievance) can be defined as some problem or pain point that the customer faced which dampened his/her experience. In some instances, the analytics system 120 can extract all the customer complaints and grievances from feedback 132 data (including business-customer interactions) and group similar complaints together for decision making. Example processes to extract complaints from feedback 132 data are described herein in FIG. 11.

At block 240, the method 200 involves generating, by the analytics system 120, a presentation 119 file based on the analytical data, wherein the presentation 119 file includes one or more combinations of themes 115, actionable insights 116, and questions 117 according to the presentation template. In some instances, the presentation 119 file includes one or more combinations of themes 115, actionable insights 116, questions 117, sentiments 114, and customer complaints, according to the presentation template. The analytics system 120 can generate the presentation 119 file using the presentation 119 template described in block 210. The presentation 119 file can be a portable document format ("PDF"), a slide show format (e.g. a Microsoft PowerPoint® presentation) or other document format. The presentation 119 file is able to provide a presentation 119 including multiple views or sections (e.g. one view per slide, page, or other section of the template), where each view or section presents a respective predefined combination of one or more of the analytical data. Each view or section includes a number of and/or manner in which to incorporate the sentiments 114, themes 115, actionable insights 116, questions 117, and/or customer complaints, as applicable, within the respective combination for the section. Certain views or sections may present the respective predefined combination of the one or more of the analytical data in a graphical format (e.g. in one or more charts, graphs, lists, callouts, videos, popups, other user interface objects, or other graphical and/or interactive items). Examples of views provided in a presentation 119 generated via a presentation template are illustrated in FIG. 3, FIG. 4, and FIG. 5.

At block 250, the method 200 involves causing, by the analytics system 120, the presentation 119 file to be transmitted to the client computing device 110. For example, the analytics system 120 transmits the generated presentation 119 file to the client computing device 110 via the network 140. The client computing device 110 receives the presentation 119 file via the network 140 from the analytics system 120 and displays, via the user interface 111, the presentation 119 defined in the presentation 119 file. In some instances, the user interface 111 displays each of the views or sections of the presentation 119 or can transition between views or sections responsive to receiving one or more inputs via the user interface 111. For example, the presentation 119 may include one or more user interface 111 objects that, upon selection, enable the user to transition between views or sections of the presentation 119. Example views of the presentation 119 are illustrated in FIG. 3, FIG. 4, and FIG. 5. However, other views may be used in addition to, or instead of, the example views described herein. Further, the following example views described herein in FIG. 3, FIG. 4, and FIG. 5 could include more, less, or different combinations of analytical data (e.g. themes, actionable insights, sentiments, questions, complaints) than the specific combinations of analytical data illustrated in these figures.

FIG. 3 depicts an illustration of a theme sentiment view 300 in a presentation 119 generated according to the method of FIG. 2, according to certain embodiments disclosed herein. As depicted in FIG. 3, a sentiment distribution graph 302 is shown that shows a sentiments 114 distribution (according to sentiment 114 category) for a set of themes 115 determined from feedback 132 data. For each of the themes 115, the graph 302 in the theme sentiment view 300 depicts a count of a number of instances of feedback corresponding to the respective theme 115 which fall under each of sentiment 114 categories "neutral," "negative," and "positive." Also, the theme sentiment view 300 illustrated in FIG. 3 displays an example positive sentiment 114 feedback 132-1 and an example negative sentiment 114 feedback 132-2. In certain examples, the analytics system 120 selects a positive sentiment 114 feedback 132-1 having, among all positive sentiment feedback having a length of greater than a threshold number of words (e.g. 8 words), a greatest number of occurrences in the feedback 132 data as the example positive sentiment 132-1. In certain examples, the analytics system 120 selects a negative sentiment 114 feedback 132-2 having, among all negative sentiment feedback having a length of greater than a threshold number of words (e.g. 8 words), a greatest number of occurrences in the feedback 132 data as the example negative sentiment 132-2 The displayed exemplary feedback 132-1 data and feedback 132-2 data can include, as depicted in FIG. 3, a portion of or an entirety of a respective feedback text. Further, the theme sentiment view 300 displays a complaint listing 301, which lists a set of the most frequently encountered customer complaints in the feedback 132 data as detected by the analytics system 120. As can be seen in this example theme sentiment view 300, an entity can make useful insights based on the specific combination of analytical data displayed. For instance, the sentiment distribution for the credit card theme 115 appears to include a significant percentage of negative sentiment 114 feedback, and complaints in the complaint listing 301 mention "charging their credit card" and "not receiving proper credit," which may provide more details as to why the sentiment 114 distribution has the significant portion of negative feedback for the credit card theme 115.

FIG. 4 depicts an illustration of a theme question view 400 in a presentation 119 generated according to the method of FIG. 2, according to certain embodiments disclosed herein. As depicted in FIG. 4, the theme question view 400 includes a theme vs. questions count graph 401 that shows, for each of a set of themes 115 determined from the feedback 132 data, a number of questions 117 in the feedback 132 data associated with each of the set of themes 115. Further, the theme question view 400 includes a frequently asked question (FAQ) section 401 that includes a list of questions 117 detected from the feedback 132 data which were most frequently asked. As can be seen in this example theme question view 400, an entity can make useful insights based on the specific combination of analytical data displayed. For instance, the graph 401 indicates a number of questions 117 about the "shuttle service" theme 115 were determined from the feedback 132 data, and one of the most frequent question in the FAQ section 401 states "how can i book hotel room service including breakfast lunch dinner and airport transfer" which may indicate a partial reason that is causing so many questions be asked about this subject (e.g. customers are confused as to how to book services including adding a shuttle service for airport transfer).

FIG. 5 depicts an illustration of an actionable view 500 in a presentation 119 generated according to the method of FIG. 2, according to certain embodiments disclosed herein. As depicted in FIG. 5, the actionable view 500 displays an actionable vs. count graph 501 which indicates, for each of a set of themes 115, a count of actionable insights 116 detected in the feedback 132 for each theme 115. Further, the actionable view 500 provides an actionable insight listing 502 that provides a list of the largest groups of actionable insights 116 detected in the feedback 132 data. As can be seen in this example actionable view 500, an entity can make useful insights based on the specific combination of analytical data displayed. For instance, the graph 501 indicates a number of actionable insights 116 corresponding to the "food" theme 115 is greater than a number corresponding to the "staff" theme 115 were determined from the feedback 132 data, and one of the most frequent actionable insights in the actionable insight listing 502 states "they are not satisfied with the bar/lounge area" which may indicate a partial reason that is causing so many actionable insights for the food theme 115 (e.g. customers could be unsatisfied with the bar/lounge area due to both food and staff, but more so because the food is terrible and not as much due to experiences with the staff. Further analysis of the data could provide more clarity).

Examples of Computer-Implemented Operations for Pre-Processing Feedback Data Received from Multiple Channels.

In certain embodiments, the preprocessing subsystem 121 applies channel-specific processing models 122 to a feedback 132 data (132-1, 132-2, . . . 132-N) for an entity received from data stores (e.g. 131-1, 131-2, . . . 131-N) of multiple review systems (e.g. 130-1, 130-2, . . . , 130-N) to generate a feedback text associated with each feedback of the feedback 132 data. In certain instances, the feedback 132 data comprises feedback from a single channel, for example, all of the feedback of the feedback 132 data includes social media posts. In other instances, the feedback 132 data includes feedback from multiple channels. For example, the feedback 132 data could include a mixture of social media posts, surveys, e-mail messages, or other types of feedback 132 data. Feedback 132 data received from specific channels (e.g. feedback types) may have channel-specific noise which is cleaned by the preprocessing subsystem 121 before further processing. In some instances, each of the review systems 130 may be associated with a specific channel (e.g. a specific type of review), for example, channels may include social media posts, telephone reviews, messaging system exchanges, review forms, or other types of feedback 132. For example, the preprocessing subsystem 121 may apply a social media channel-specific preprocessing model 122 to process feedback 132 data comprising a social media post received from a social media review system 130-1. the preprocessing subsystem 121 may apply a telephone call channel preprocessing model 122, a chat channel preprocessing model 122, an e-mail channel preprocessing model 122, and a survey channel preprocessing model 122 to process feedback 132 data comprising a call transcript, a chat message exchange, an e-mail message, and a survey, respectively. Other preprocessing models 122 may be used in addition to or instead of these example preprocessing models 122. In some instances, the preprocessing subsystem 121. In some instances, (a) for social media post feedback 132 data, a social media channel preprocessing model 122 may remove uniform resource locators (URLs), hashtags, mentions, reserved words, emojis and smileys, (b) for call transcript feedback 132 data, a call channel preprocessing model 122 may remove agent utterances, remove greetings, filter out system generated messages, and remove non-informative messages, (c) for email feedback 132 data, an email channel preprocessing model 122 may remove pleasantries, salutations, URLs, and system generated meta information. Identification of disclaimer and signatures. (d) for survey feedback 132 data, a survey channel preprocessing model 122 may remove introductory non-informative questions, questions from the data, and emojis from text responses.

Examples of Computer-Implemented Operations for Generating Themes from Feedback Data.

Figure 6:
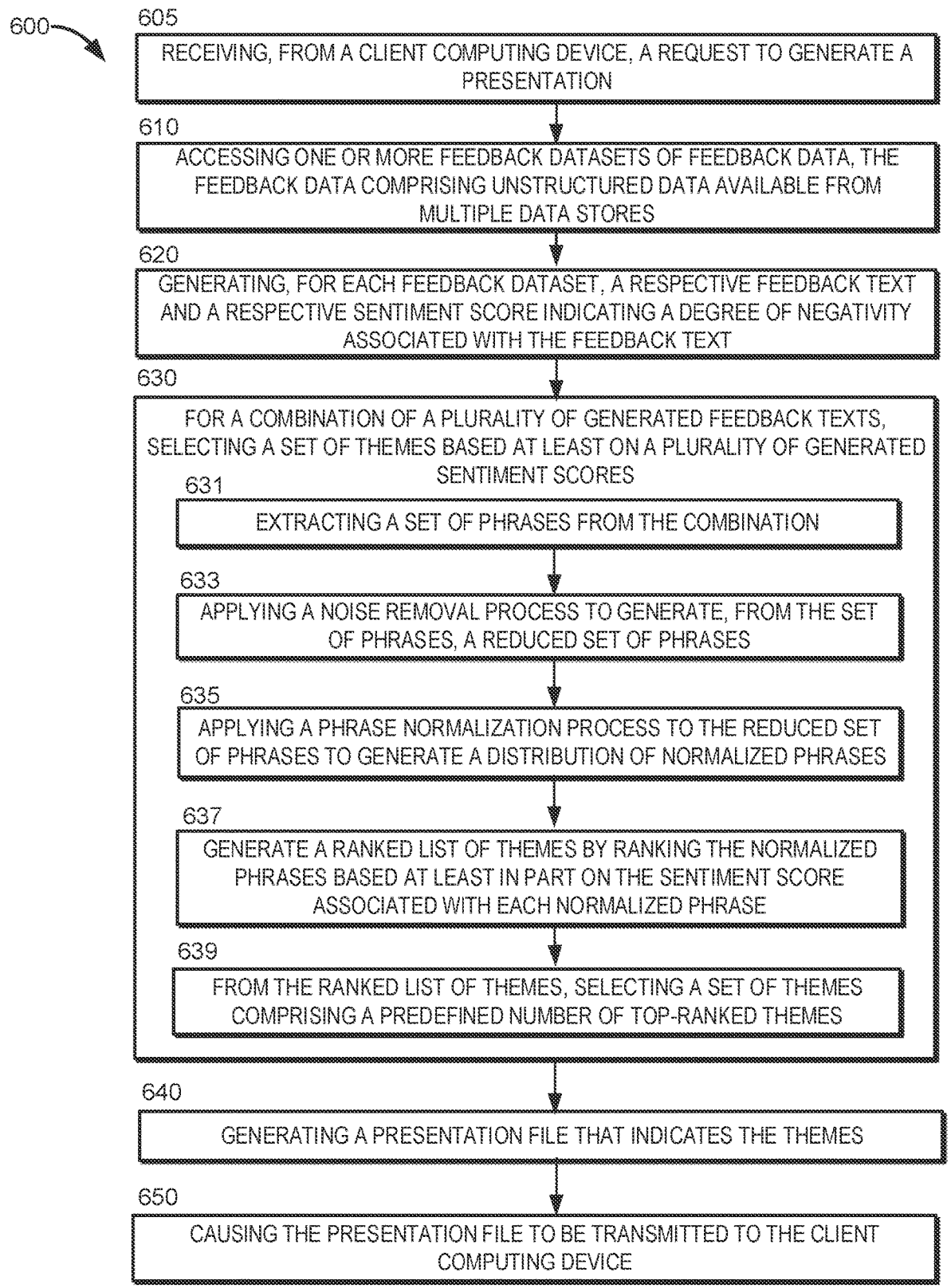
FIG. 6 depicts a method for generating themes from feedback data, according to certain embodiments disclosed herein.

FIG. 6 depicts a method 600 for generating themes from feedback data, according to certain embodiments disclosed herein. One or more computing devices (e.g., the analytics system 120 and/or the theme generation subsystem 125) implement operations depicted in FIG. 6. For illustrative purposes, the process 600 is described with reference to certain examples depicted in the figures. Other implementations, however, are possible.

At block 605, the method 600 involves receiving, by the analytics system 120 from a client computing device 110, a request to generate a presentation 119. In some instances, the request indicates a presentation template to present theme 115 information in combination with one or more of actionable insights 116 information, question 117 information, sentiment 114 information, and customer complaints information. Block 210 of FIG. 2 describes an example of receiving a request to generate a presentation 119.

At block 610, the method 600 involves accessing, by the analytics system 120, one or more feedback 132 datasets of feedback data, the feedback data comprising unstructured data available from multiple data stores 131. For example, the analytics system 120 accesses available feedback data 132 associated with the entity specified in the request for a presentation 119 received from the client computing device 110. The analytics system 120 accesses feedback 132 data or otherwise receives the feedback 132 data (feedback 132-1, 132-2, . . . , 132-N) from one or more data stores 131 (e.g. data stores 131-1, 131-2, . . . , 131-N) of review systems 130 (e.g. review systems 130-1, 130-2, . . . , 130-N). In other instances, the feedback 132 data is received from one or more data stores 131 of a single review system 130. The feedback 132 data could include multiple channels, including user reviews, commentary, social media posts, interactive chat transcripts, call transcripts, surveys, or other information describing the entity or products/services provided by the entity. The feedback 132 datasets are unstructured because as the multiple channels of feedback do not share a common format or data structure. For example, a format of a survey (e.g. a serious of questions with freeform and/or selected multiple choice answers) can be vastly different from a format of a social media post (e.g. free text), a review (e.g. free text and a selected rating), and a chat message exchange (e.g. a series of texts exchanged between a user and an agent).

At block 620, the method 600 involves generating, for each feedback 132 dataset, a respective feedback text and a respective sentiment 114 score indicating a degree of negativity associated with the feedback text. In some instances, determining the analytical data (e.g. themes, actionable insights, questions, complaints, sentiments), first quires preprocessing the various unstructured feedback data to generate feedback texts from which the analytical data can be extracted or otherwise determined by specific processes, including applying specific channel-specific preprocessing models 122 to each feedback 132 dataset. The analytics system 120 can generate, using the preprocessing model 121, a feedback text for each feedback 132 dataset and determine, using the sentiment extraction subsystem 124, a sentiment 114 for each feedback text. Examples of determining sentiment 114 for generated feedback texts are described in FIG. 9.

At block 630, the method 600 involves selecting, by the analytics system 120, for a combination of a plurality of generated feedback texts, a set of themes 115 based at least on a plurality of generated sentiment 114 scores. In some instances, each of the sentiment 114 scores of the plurality of generated sentiment 114 scores is associated with one of the plurality of generated feedback texts. In certain embodiments, the analytics system 120 uses a funnel approach which starts with almost all possible phrases within a text interaction and, moving down the funnel, optimizes for precision by removing phrases that are not key concepts. In some instances, the method 600 at block 630 involves implementing blocks 631, 633, 635, 637, and 639.

At block 631, the method 600 involves extracting, by the analytics system 120, a set of phrases from the combination of the plurality of generated feedback texts. In some instances, the analytics system 120 generates a text corpus including a combination of the plurality of generated feedback texts for the feedback 132 datasets. The analytics system 120, using a phrase extraction module of the theme generation subsystem 117, can refine the text corpus by lowercasing the text and removing any noise, present due to source channel. The analytics system 120 can further refine the text corpus by removing phrases which include punctuations (e.g. "medical imaging, and"), phrases which are formed using tokens from either side of a sentence boundary (e.g. "parameters. These cluster . . . ," and removing non-alphabetic characters (e.g. remove $ in "50$ price"). Refining the text corpus results in a text corpus including all potential candidates for themes 115.

At block 633, the method 600 involves applying, by the analytics system 120, a noise removal process to generate a reduced set of phrases. The analytics system 120, using a noise removal module of the theme generation subsystem 117, can, for each phrase of the refined text corpus, determine whether (1) the phrase leading and ending token as stop word. Ex: ["is best match for"], (2) tokens of the phrase do not correspond to a known vocabulary, and (3) tokens of the phrase deal with phrases like "gon na" which are commonly used in a conversation but would most likely act as noise phrase. In some instances, if any of (1), (2), and/or (3) is detected, the analytics system 120 removes phrase from being considered as a candidate theme 115. In addition, Named Entity Recognition (NER) tags of "PERSON", "LOCATION", "QUANTITY", "TIME" types are removed from the text corpus and phrases having high semantic similarity to such tags are also removed as they are most likely to be treated as noise. Example of this process could be "1 O'clock daily scrum" phrase would be removed as this phrase would have very high similarity with "O' clock."

At block 635, the method 600 involves applying, by the analytics system 120, a phrase normalization process to the reduced set of phrases to generate a distribution of normalized phrases. In some instances, after applying block 633, most of the remaining phrases in the text corpus are clean, yet they consist of many repetitions. These repetitions are either due to the variation of the root form of the tokens or have phrases which are very similar to each other. To deal with the 1st form of repetition, the analytics system 120 may perform phrase lemmatization, which is a very effective technique whereas to deal with the 2nd form, the analytics system 120 can use phrase embedding to capture a semantic similarity. Various methods may be used to learn the phrase embedding. For example, a BERT language model can be fine-tuned on STSB-NLI dataset to establish a baseline. Further, the analytics system 120 can train the BERT language models on the domain specific vocabulary and our experiments indicated that using the domain trained embeddings had better accuracy in performing phrase normalizations. In some instances, an order of operations of these steps are important to remove the redundancy. Accordingly, the analytics system 120 may begin by clubbing the phrases which have same root form and this step on an average reduced the phrase set size by 5-10%. Now to group the phrases based on their meaning the remaining set of phrases are ranked based frequency of occurrence in the text corpus and the type of n-gram. Bigrams and trigrams are given higher preference as they provide a bit more information compared to unigrams and are considered ideal candidates for group heads. By the end of block 635, all the phrases (group heads) are clean and unique and, in some instances, can reduce the phrases set size by another 5-10%.

At block 637, the method 600 involves generating, by the analytics system 120, a list of themes 115 by ranking the normalized phrases based at least in part on a sentiment 114 score associated with each normalized phrase. The analytics system 120 may use one or more considerations as a basis for ranking the normalized phrases. For example, the analytics system 120 may rank the normalized phrases based on one or more of: (1) a frequency of phrases combined with a frequency of other similar phrases extracted at block 635, (2) a linguistic pattern score which considers a part of speech (POS) pattern of the phrase (e.g. multiple occurrences of a Noun or a Proper Noun in the phrase is a very good fit for abstract topics/themes), (3) a location of the phrase in the text (4) a number of similar phrases associated with the phrase, or (5) a sentiment 114 score of the sentence from which the phrase is extracted. These signals (1), (2), (3), (4), and (5) may help to identify a reason behind a ranking for each of the phrases, making the solution explainable. Other signals may be added based on any additional data present like inquiry meta data from the client and, accordingly, corresponding weights or factors can be altered before a final ranking of the phrases. Phrases ranked the highest are most likely to be the key concepts (themes 115).

At block 639, the method 600 involves selecting, by the analytics system 120 from the ranked list of themes generated in block 637, a set of themes comprising a predefined number of top-ranked themes. In certain examples, the number of top-ranked themes is configurable. In some instances, the operator of the client computing device 110 can configure the predefined number using one or more settings on the application 112.

At block 640, the method 600 involves generating, by the analytics system 120, a presentation 119 file that indicates the themes 115. An example of generating a presentation 119 is described in FIG. 2 and examples of specific views or sections of a presentation 119 are described in FIGS. 3, 4, and 5. The themes 115 information determined in block 630 (e.g. a selected set of themes 115) can be incorporated into the presentation 119. For example, theme 115 can be considered as a dimension of a graph, for example, as it is illustrated in the theme sentiment view 300 of FIG. 3 the theme question view 400 of FIG. 4, and the actionable view 500 of FIG. 5. For example, the theme question view 400 of FIG. 4 illustrates a number of questions for each of a set of themes 115.

At block 650, the method 600 involves causing the presentation 119 file to be transmitted to the client computing device 110. For example, the presentation 119 file generated at block 640 is transmitted via the network 140 to the client computing device 110, which receives the presentation 119 file and displays, via the user interface 111, the presentation 119 defined by the presentation 119 file. An example of causing the presentation 119 file to be transmitted to the client computing device 110 is described in block 250 of FIG. 2.

Examples of Computer-Implemented Operations for Generating Actionable Insights from Feedback Data.

Figure 7:
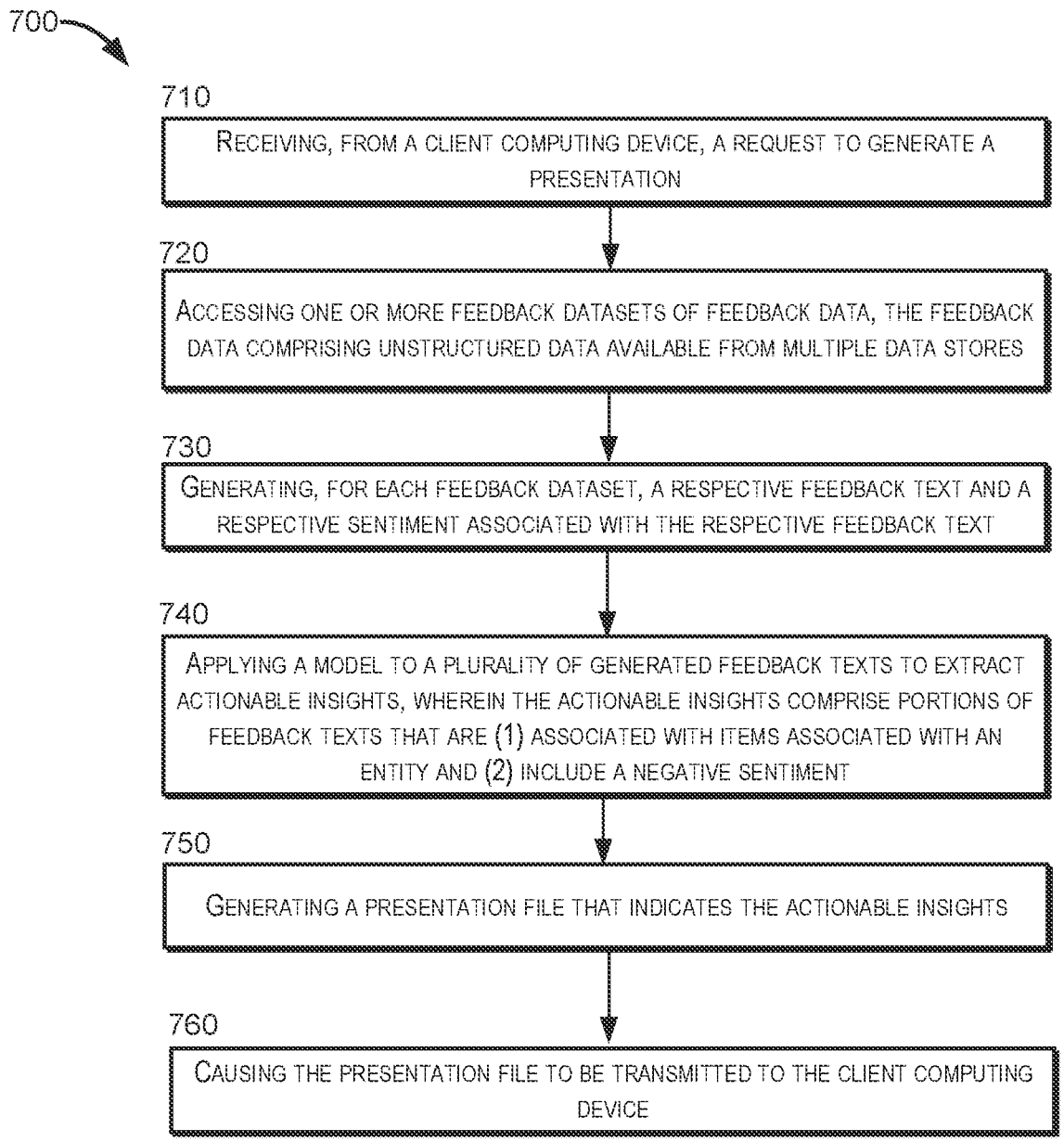
FIG. 7 depicts a method for generating actionable insights from feedback data, according to certain embodiments disclosed herein.

FIG. 7 depicts a method for generating actionable insights from feedback data, according to certain embodiments disclosed herein. One or more computing devices (e.g., the analytics system 120 or the actionable insights generator subsystem 126) implement operations depicted in FIG. 7. For illustrative purposes, the process 700 is described with reference to certain examples depicted in the figures. Other implementations, however, are possible.

At block 710, the method 700 involves receiving, by the analytics system 120 from a client computing device 110, a request to generate a presentation 119. In some instances, the request indicates a presentation template to present actionable insights 116 information in combination with one or more of themes 115 information, question 117 information, sentiment 114 information, and customer complaints information. Block 210 of FIG. 2 describes an example of receiving a request to generate a presentation 119.

At block 720, the method 700 involves accessing, by the analytics system 120, one or more feedback 132 datasets of feedback data, the feedback data comprising unstructured data available from multiple data stores 131. For example, the analytics system 120 accesses available feedback data 132 associated with the entity specified in the request for a presentation 119 received from the client computing device 110. The analytics system 120 accesses feedback 132 data or otherwise receives the feedback 132 data (feedback 132-1, 132-2, . . . , 132-N) from one or more data stores 131 (e.g. data stores 131-1, 131-2, . . . , 131-N) of review systems 130 (e.g. review systems 130-1, 130-2, . . . , 130-N). In other instances, the feedback 132 data is received from one or more data stores 131 of a single review system 130. The feedback 132 data could include multiple channels, including user reviews, commentary, social media posts, interactive chat transcripts, call transcripts, surveys, or other information describing the entity or products/services provided by the entity. The feedback 132 datasets are unstructured because as the multiple channels of feedback do not share a common format or data structure. For example, a format of a survey (e.g. a serious of questions with freeform and/or selected multiple choice answers) can be vastly different from a format of a social media post (e.g. free text), a review (e.g. free text and a selected rating), and a chat message exchange (e.g. a series of texts exchanged between a user and an agent).

At block 730, the method 700 involves generating, by the analytics system 120 for each feedback 132 dataset, a respective feedback text and a respective sentiment 114 associated with the respective feedback text. In some instances, determining the analytical data (e.g. themes, actionable insights, questions, complaints, sentiments), first requires preprocessing the various unstructured feedback data to generate feedback texts from which the analytical data can be extracted or otherwise determined by specific processes, including applying specific channel-specific preprocessing models 122 to each feedback 132 dataset. The analytics system 120 can generate, using the preprocessing model 122, a feedback text for each feedback 132 dataset. In some instances, channel specific preprocessing performed by the preprocessing subsystem 121 helps determine the insights from feedback from diverse channels. The analytics system 120 generates insights to be of similar syntactic and semantic nature, even though the inputs are of different natures. Similarity in the nature of the generated insights make it easier to combine the similar insights together and provide a holistic and coherent picture of customer issues. The analytics system 120 can use phrase embeddings and clustering methods to come up with homogeneous issue clusters. The analytics system 120 can determine, using the sentiment extraction subsystem 124, a sentiment 114 for each generated feedback text. Examples of determining sentiment 114 for generated feedback texts are described in FIG. 9.

At block 740, the method 700 involves applying, by the analytics system 120, a model to a plurality of generated feedback texts to extract actionable insights 116, wherein the actionable insights 116 comprise portions of feedback texts that are (1) associated with items associated with an entity and (2) include a negative sentiment 114. The model can extract issues that are mentioned in formal and informal feedback data sources and convert the issues to actionable insights using an underlying deep learning algorithm. In certain embodiments, the model comprises a long form question answer (LFQA) model. Examples of using an LFQA model to determine actionable insights 116 for feedback 132 data are described in further detail herein in FIG. 8.

In certain embodiments, the analytics system 120 cleans the responses generated from QA module to generate the actionable insights 116. To clean these responses, the analytics system 120 performs a frequent n-gram analysis to check the distribution. Since the underlying QA model is generative in nature, it tends to start or end answers in similar fashion. These heads and tails of the sentences are often present to provide a grammatical structure to the sentence without carrying much information. The analytics system 120 identifies and remove these n-grams to retain the informative bit for downstream processing and normalizes process. For example, a template of the question is: what is the issue with <abstractive insight>? In some instances, the model functions better with specific, rather than general questions. If a generic question is asked to the QA model, a non-actionable item may be output by the model.

The following are example of actionable insights 116 that can be generated at block 740:

| Actionable Insight | Customer Feedback |
|---|---|
| They are trying to promote the home delivery nonsense. | it is not for anything i would ever use. you all should maybe quit trying to take advantage of people's fears by trying to force this home delivery nonsense on me. |
| The voice over is not good in the ad campaign. | i do not really like this brand, and even less like voice over in this ad. |
| The ads were boring to me. | I disliked it because it was frankly just tedious to me. but I feel that way about most advertisements. |
| It attempts to advertise low end crap food as healthy. | Disguising low end crap food as somehow nutritious and healthy. |
| The food product was not as good as the music. | I liked the music I did not like the food product. and I am not a football person. |
| The ads were plain and did not catch my attention. | Is hard to say what I would want to see in an ad. Many of the ads were plain and did not catch my attention. |
| It seems to be targeting minorities and not the majority | Seems to be only targeting minorities and totally ignoring the majority. Political correctness is getting extremely old! |
| This is not a good advertising medium. | I do not like Merchant A as a brand or as a store and this ad did not change my opnion at all. I really dislike these radio/audio ads where the person is speaking so fast it becomes annoying. |
| The ad was rushed to show the difference in prices. | I liked the comparison done between Merchant A and Merchant B. I disliked that the tape displaying the amounts charged for products was rolled so quickly you could not see the disparity excepty at the end of the tape. |
| It does not show the right service or option for me. | it is shows a convenient option. it presented and explained it very well. it is just not the type of service or option I would ever care to use. | across singular/plural & verb tenses to improve hierarchical representation. The analytics system 120 then passes the filtered, denoised and cleaned QA responses to a deep-learning model that generates the equivalent contextual phrase embeddings to represent the input in 768-dimension space. The generated embedding represents the phrases' meaning which is used for comparing and grouping the phrases based into homogeneous clusters. For example, the analytics system 120 computes a cosine similarity of documents (e.g. feedback texts) among one another. The analytics system 120 uses agglomerative clustering to create groups/clusters. In some instances, in order to determine cluster/group center, the analytics system 120 selects an actionable insight 116 with maximum occurrence within the cluster. In certain embodiments, the analytics system 120 further generates a theme at document (e.g. feedback text) level. The analytics system 120 can generate a theme by using informative actionable insights post cleaning and normalization. The analytics system 120 can first remove stop-words and punctuations from them and store lemmatized form of actionable insights (output 409.1). If the intermediate output is unigram, the analytics system 120 can mark it as a theme candidate. If any of such theme candidates is present, the analytics system 120 can mark them as theme candidates. The analytics system 120 can cluster theme candidates using agglomerative hierarchical clustering to generate themes—one level higher abstraction then theme candidates.

In certain examples, the analytics system 120 identifies, for each feedback text, a snippet of the feedback text that contains an actionable insight and highlights it to the end user (e.g. in the presentation 119 file for display to the user via the client computing device 110). The analytics system 130 can do this by leveraging extractive QA model. The question asked to the extractive QA model is governed by the output of the filtering, cleaning, and noise reduction At block 750, the method 700 involves generating, by the analytics system 120, a presentation 119 file that indicates the actionable insights 116. An example of generating a presentation 119 is described in FIG. 2 and examples of specific views or sections of a presentation 119 are described in FIGS. 3, 4, and 5. The actionable insights 116 information determined in block 740 (e.g. a set of actionable insights 116) can be incorporated into the presentation 119. For example, actionable insights 116 count can be considered as a dimension of a graph, for example, as it is illustrated in the actionable view 500 of FIG. 5. For example, the actionable view 500 of FIG. 5 illustrates a number actionable insights 116 associated with each of a set of themes 115.

At block 760, the method 700 involves causing, by the analytics system 120, the presentation 119 file to be transmitted to the client computing device 110. For example, the presentation 119 file generated at block 750 is transmitted via the network 140 to the client computing device 110, which receives the presentation 119 file and displays, via the user interface 111, the presentation 119 defined by the presentation 119 file. An example of causing the presentation 119 file to be transmitted to the client computing device 110 is described in block 250 of FIG. 2.

Figure 8:
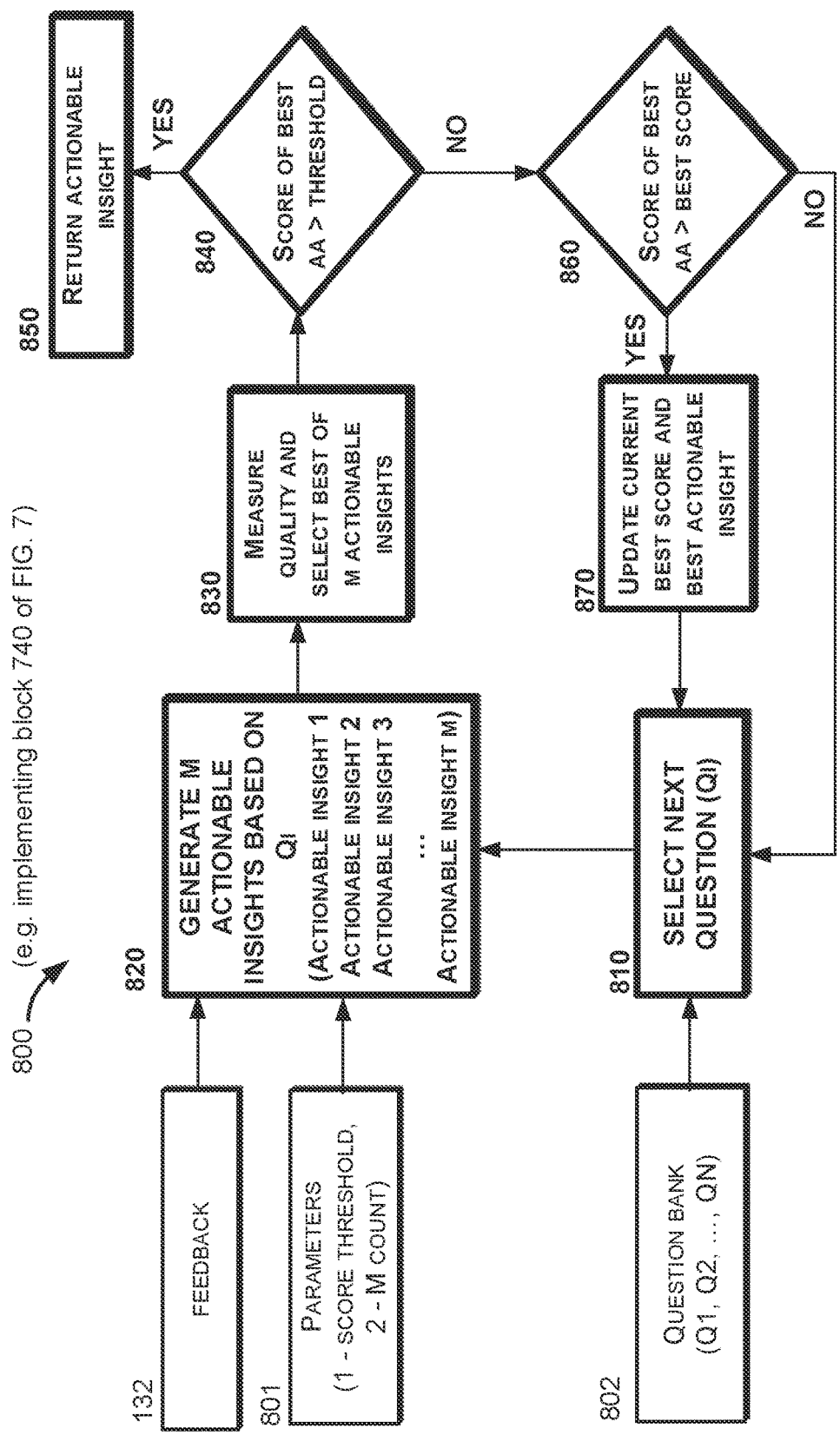
FIG. 8 depicts a method, for use in conjunction with the process of FIG. 7, for determining actionable insights for feedback data by applying a long form question answer (LFQA) model to the feedback data, according to certain embodiments disclosed herein.

FIG. 8 depicts an example of a method 800 for determining, by an analytics system 120, actionable insights 116 for feedback 132 data by applying a long form question answer (LFQA) model to the feedback 132 data, according to certain embodiments disclosed herein. One or more computing devices (e.g., the analytics system 120 or the actionable insights generator subsystem 126) implement operations depicted in FIG. 8. For illustrative purposes, the method 800 is described with reference to certain examples depicted in the figures. Other implementations, however, are possible. In certain examples, the method 800 is used in conjunction with method 700 of FIG. 7. For example, in some instances, method 800 illustrated in FIG. 8 is used to implement block 740 of method 700 illustrated in FIG. 7.

Long form QA (LFQA) models are aimed to answer query question from a given document or multiple documents. In certain embodiments, the analytics system 120 uses an encoder-decoder transformer based LFQA model to generate actionable insights 116 from a customer feedback.

In certain embodiments, before applying the LFAQ model (or other model), the feedback 132 text is filtered or otherwise reduced so that the model is only applied to the remaining feedback 132 texts that are likely to include actionable insights 116. The analytics system 120 may use proxy methods to classify whether actionable insight 116 is present in the feedback. A first method uses a number of tokens and a second method uses an inverse document frequency (IDF) score. Both techniques may be most effective when using a significantly large dataset (feedbacks in the order of thousands). In the first method, it is assumed that feedback that is extremely short does not contain actionable insights and that, when feedbacks are verbose, it may be challenging to identify effective actionable insights 116. Accordingly, in the first method, the analytics system 120 can determine length thresholds based on (a) domain expertise and (b) token count distribution across entire dataset, in order to filter or otherwise reduce the feedback 132 text before applying the model to the feedback 132 text. In the second method, the analytics system 120 calculates an inverse document frequency (IDF) for each token in the dataset. Feedback level IDF score is calculated by measuring median of its token level IDF. It may be assumed that verbatims with very low LDF score contain generic feedback and whereas the ones with very high IDF scores often contains mis-spelled tokens and the analytics system 120 marks any such feedback 132 texts as non-actionable. In a third method to reduce the feedback 132 text when detecting actionable insights 116, the analytics system 120 trains a classifier model using training data labeled by a human as either being an actionable insight 116 or not being an actionable insight 116.

At block 810, the method 800 involves selecting, by the analytics system 120, a next question (Qi) from a question bank 802. For example, the question bank 802 comprises a predefined list of questions targeted to generate, via answers provided by the LFQA model, outputs including actionable insights 116. For example, a single universal question may not provide correct actionable insights 116. Therefore, the analytics system 120 may use the question bank comprising multiple questions for detailed and more accurate actionable insights 116.

At block 820, the method 800 involves generating, by the analytics system 120, a number (M) of actionable insights 116 based on the selected next question (Qi). In some instances, when using probabilistic generation, the analytics system 120 generates M different actionable insights for a given feedback and question in a single inference.

At block 830, the method 800 involves measuring, by the analytics system 120, a quality of the actionable insights 116 generated in block 820 and selecting a best of the actionable insights 116 generated in block 820. The analytics system 120 can use controlled/guided generation to improve quality of actionable insights 116. Controlled actionable generation can be optimized to improve average score of cosine similarity and entailment between feedback 132 and actionable insight 116. The analytics system 120 selects the actionable insight 116 that scores best and stores it along with the score (e.g. a in a data storage unit accessible to the analytics system 120).

At block 840, the method 800 involves determining, by the analytics system 120 if a score of the best actionable insight 116 selected in block 830 is greater than a threshold score. An operator of the analytics system 120 can configure the threshold score. In certain embodiments, a greater threshold score will result in better actionable insights when compared to when a lower threshold score is used.

If the analytics system 120 determines that the score of the best actionable insight 116 selected in block 830 is greater than the threshold score, the method 800 proceeds to block 850.

At block 850, the method 800 involves returning, by the analytics system 120, the actionable insight 116 selected in block 830. Accordingly, the analytics system 120 can use controlled/guided generation in blocks 810-840 to improve quality of actionable insights 116. Controlled actionable generation can be optimized to improve average score of cosine similarity and entailment between feedback 132 and actionable insight 116.

Returning to block 840, if the analytics system 120 determines that the score of the best actionable insight 116 selected in block 830 is not greater than the threshold score, the method 800 proceeds to block 860.

At block 860, the method 800 involves determining, by the analytics system 120 if the score of the best actionable insight 116 selected in block 830 is greater than a historical best score.

If the analytics system 120 determines that the score of the best actionable insight 116 selected in block 830 is greater than the historical best score, the method 800 proceeds to block 870.

At block 870, the method 800 involves updating a current best score and a best actionable insight 116. For example, the analytics system 120 updates the current best score and the best actionable insight 116 to be the actionable insight 116 determined in block 830 and its associated score.

From block 870, the method 800 returns to block 810. For example, at block 810, the analytics system 120 selects the next question from the question bank. If required, the analytics system 120 repeats the entire loop of FIG. 8 up to K times (K is a loop threshold set by an operator of the analytics system 120 or by a user of the client computing device 110) to further improve the actionable insights 116 produced.

Returning to block 860, if the analytics system 120 determines that the score of the best actionable insight 116 selected in block 830 is not greater than the historical best score, the method 800 returns to block 810. For example, at block 810, the analytics system 120 selects the next question from the question bank.

If required, the analytics system 120 repeats the entire method of FIG. 8 K times (K is a loop threshold set by an operator of the analytics system 120 or by a user of the client computing device 110) to further improve the results. The analytics system 120 enables an operator to select a configuration for number of questions (N) and number of answers per questions (M) while generating actionable insight as following:

| Feedback | question | 1X1 | answer |
|---|---|---|---|
| Feedback | question_1 | NX1 | answer_1 |
|  | question_2 |  | answer_2 |
|  | — |  | — |
|  | question_N |  | answer_N |

| Feedback | question | 1X1 | answer |
|---|---|---|---|
| Feedback | question_1 | 1XM | answer_1 |
|  |  |  | answer_2 |
|  |  |  | answer_3 |
|  |  |  | — |
| Feedback | question_1 | NXM | answer_11 |
|  |  |  | — |
|  |  |  | answer_1M |
|  | question_2 |  | answer_21 |
|  |  |  | — |
|  |  |  | answer_2M |
|  |  |  | — |
|  |  |  | — |
|  |  |  | — |
|  | question_N |  | answer_N1 |
|  |  |  | — |
|  |  |  | answer_NM |

1-Multi-Question & Multi-Answer Setting

Examples of Computer-Implemented Operations for Determining a Sentiment for Feedback.

Figure 9:
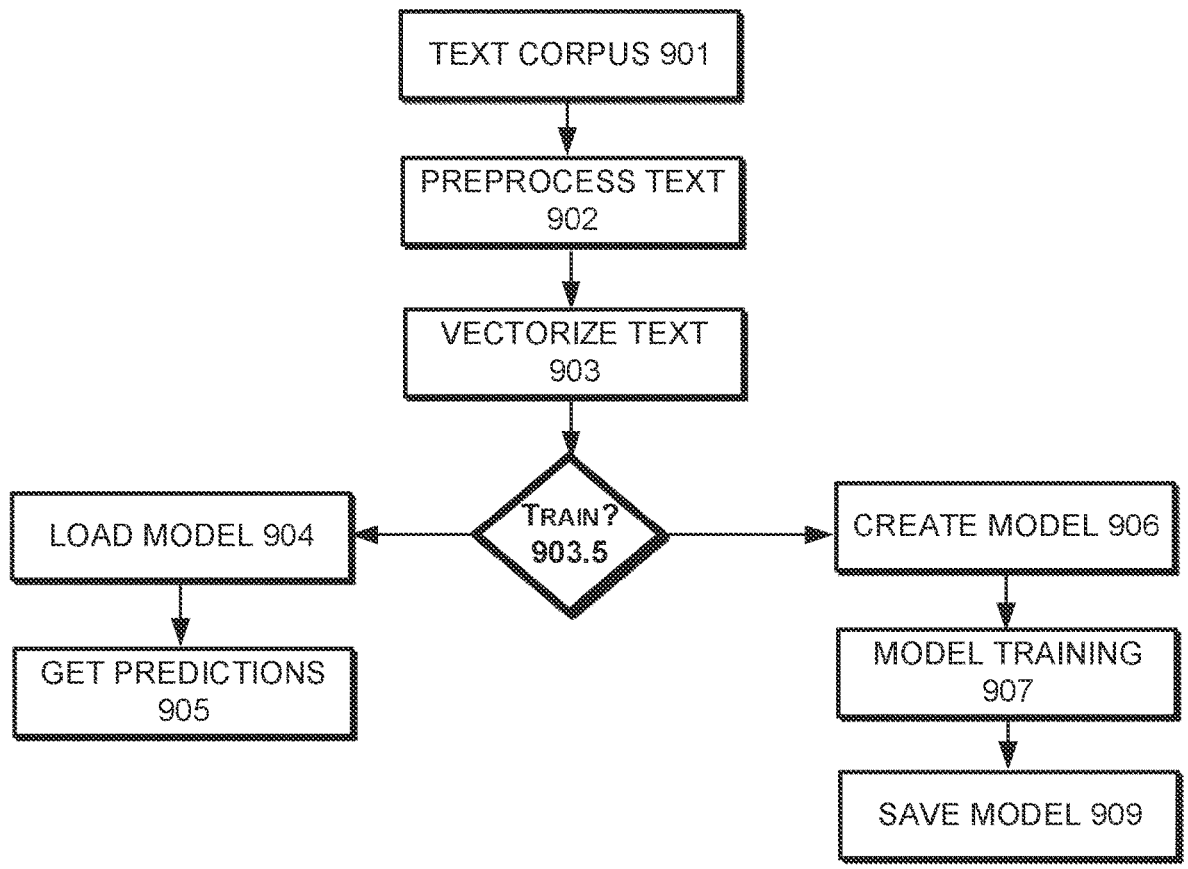
FIG. 9 depicts a method for determining a sentiment for a feedback, according to certain embodiments disclosed herein.

FIG. 9 depicts an example of a sentiment extraction process 900, according to certain embodiments disclosed herein. One or more computing devices (e.g., the analytics system 120 or the sentiment extractor subsystem 124) implement operations depicted in FIG. 9. For illustrative purposes, the process 900 is described with reference to certain examples depicted in the figures. Other implementations, however, are possible.

Sentiment analysis is an automated process to classify opinions into sentiment 114 classes such as Positive, Negative and Neutral. Businesses use this to monitor what consumers like or dislike about their product or service. Many ways exist to automatically process the text. For example, a contextual embedding based deep learning model can be used to identify sentiment 114 on a variety of verbatim. For each verbatim, the model provides a confidence of it belonging to positive and negative class, which in turn in augmented with an explanation of why the model predicted the probabilities based on the tokens present.

Transformer based contextual embeddings can be used to vectorize the text and a RNN (Recurrent Neural Network) based deep learning network can be applied to consume the said embedding and predict the class of each verbatim.

A business can have thousands of customers, and there are multiple sources of communication, which can lead to a huge amount of text data being generated daily. To assess the sentiment, it is very inefficient to go through each piece of text, read it and understand the sentiment. Even if we manually select few examples, there is no way to ensure that the sample is representative of the overall sentiment of consumers and we will end up with a very skewed understanding of the overall sentiment.

The different submodules of the sentiment extraction process 900 are: Text preprocessing, Data preparation, Vectorization, Model creation, Model training, Evaluation, and Post Processing. Description of the blocks within flow chart of FIG. 9:

901: Text Corpus: This is the input to the system on which we need to either train or run inference. The input is a corpus of text, a Data frame containing reviews or comments or verbatim from various sources. A column with text and a column with true labels is expected while training whereas a column with verbatim is expected while inference.

902: Preprocess Text: This module makes sure the text is consistent with the requirement, it removes unwanted piece of information from the text. Extra spaces between two words and special characters are removed.

903: Vectorize Text: This module is used to covert text (e.g. a preprocessed feedback 132 text) into machine readable format. This module converts the text into contextual embeddings using transformer models. In an example:

| Input feedback text | | Output contextual embedding |
|---|---|---|
| The bar wasn't open which would have been nice. | [EMBEDDING MODEL] | [0.11, 0.65, 0.52, 0.58, 0.91, 0.65, 0.6, 0.91, 0.65, 0.19, 0.26, 0.08, 0.56, 0.17, 0.48, 0.51, 0.19, 0.49, 0.52, 0.73, 0.88] |
| There was limited choices of activities in the area for family | | [0.41, 0.94, 0.66, 1, 0.47, 0.41, 0.79, 0.53, 0.02, 0.37, 0.49, 0.2, 0.35, 0.43, 0.56, 0.32, 0.62, 0.22, 0.48, 0.74, 0.31] |
| There was no dinner service at hotel due to pandemic | | [0.67, 0.45, 0.2, 0.87, 0.74, 0.56, 0.02, 0.09, 0.53, 0.72, 0.7, 0.64, 0.75, 0.25, 0.37, 0.47, 0.78, 0.88, 0.22, 0.35, 0.88] |
| I am always worried nowadays when traveling | | [0.94, .015, 0.65, 0.3, 0.23, 0.46, 0.2, 0.32, 0.85, 0.78, 0.44, 0.48, 0.54, 0.99, 0.17, 0.68, 0.6, 0.14, 0.4, 0.81, 0.52] |
| We were not limited in activities due to COVID | | [0.8, 0.29, 0.1, 0.64, 0.33, 0.69, 0.69, 0.33, 0.36, 0.62, 0.47, 0.53, 0.97, 0.13, 0.49, 0.09, 0.58, 0.55, 0.99, 0.31, 0.12] |
| No house keeping and limited bar and restaurant. Could not get into the gym | | [0.92, 0.87, 0.25, 0.44, 0.46, 0.37, 0.98, 0.9, 0.2, 0.93, 0.81, 0.32, 0, 0.12, 0.07, 0.86, 0.36, 0.77, 0, 0.84, 0.77] |
| The breakfast buffet is now only grab and go. Mask wearing is a nuisance | | [0.13, 0.08, 0.58, 0.89, 0.31, 0.08, 0.56, 0.17, 0.61, 0.78, 0.32, 0.96, 0.21, 0.82, 1, 0.11, 0.37, 0.25, 0.9, 0.23, 0.29] |
| Room and hotel floor is cleaned | | [0.26, 0.14, 0.31, 0.93, 0.7, 0.57, 0.48, 0.68, 0.36, 0.58, 0.27, 0.89, 0.44, 0.99, 0.23, 0.63, 0.5, 0.67, 0.01, 0.11, 0.07] |

904: Load Model: When not training, then the model is loaded, from which is needed the predictions for the text corpus.
905 Get Predictions: The loaded model is used to run inference on the converted text embeddings and the output is processed as Positive or Negative based on a threshold.
906: Create Model: If in the training stage, the model architecture is created, which contains a bi-directional LSTM followed by a deep neural network.
907: Model Training: In this step the model learns the weights after various iteration while it is simultaneously evaluated in the validation set and metrics are calculated to ensure saving the best model.
908: Evaluation: This is where the model is evaluated based on a golden set to ensure that the model is performing as expected.
909: Save Model: Once the model is trained, it is saved in memory (e.g. a memory accessible to the analytics system 120) to be used later for inference.

Examples of Computer-Implemented Operations for Extracting Questions from Feedback Data.

Figure 10:
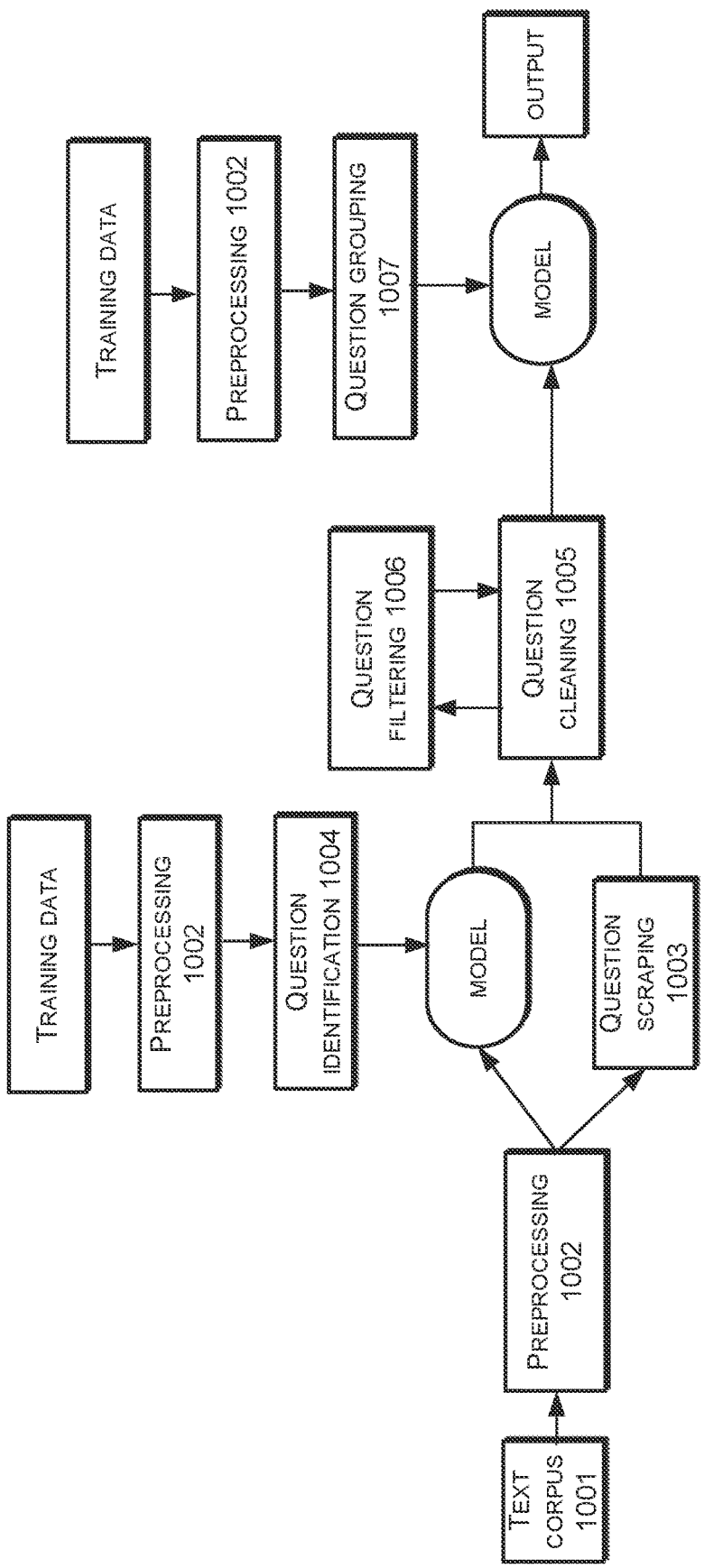
FIG. 10 depicts a method for generating a set of questions for a feedback, according to certain embodiments disclosed herein.

FIG. 10 depicts an example of a question extraction process 1000, according to certain embodiments disclosed herein. One or more computing devices (e.g., the analytics system 120 or the question generator subsystem 127) implement operations depicted in FIG. 10. For illustrative purposes, the process 1000 is described with reference to certain examples depicted in the figures. Other implementations, however, are possible.

Question analytics is an automated process to extract questions 117 from text interaction and group similar questions. Businesses use this to understand the queries and problems that their consumers are facing. Moreover, extracted questions can be further used in AI applications like—QA bot, virtual assistant, etc. Over the years, many approaches have been discussed for question 117 extraction and grouping. In certain examples, an ensemble model is used for question 117 extraction and a predictive model based on contextual embedding is used to group similar questions 117.

A business can have thousands of customers, and there are multiple channels of communication like—calls, chat, email, form, etc. which leads to a huge amount of text data being generated daily. It becomes very inefficient and redundant to go through each piece of text, read it and extract all the queries and questions from it. Similarly, it is almost impossible to group similar questions 117 together manually because it would require user to compare syntactic and semantic metadata of each question with every other question 117.

The different submodules illustrated in FIG. 10 are the following: 1002. Question Preprocessing, 1003. Question Scraping, 1004. Question Identification, 1005. Question Cleaning, 1006. Question Filtering, 1007. Question Grouping.

1001: Text Corpus: This is input to the system from which questions 117 are extracted. This input is a corpus of text, a csv file containing reviews (e.g. feedback 132, a preprocessed feedback 132 text) or comments or verbatim from different sources. An example text corpus could comprise: "Hi, Can you help me with something? I lost my confirmation number because I can't login into my account. Can you please tell me my confirmation number? Also, could you help me access my account? If we have lost it permanently then what we can do is that we can create a duplicate booking. Can you please help me with all this. Thanks."
1002: Pre-processing: This module makes the input text consistent and removes unwanted characters from the text. It converts text into lower case, expands contractions and removes extra whitespaces and special characters.
1003: Question Scraping: This module along with Question Identification 1004 forms the question 117 extraction pipeline. This is a high precision system which breaks input text into sentences and uses following rule-based heuristics to extract questions 117 from the text. 1003.1: Rules to classify a sentence as a question: 1. Sentence contains a '?' character at the end, or 2. Sentence starts with 5W-1H (what, when, which, why, who, how) or auxiliary/helping verb word (is, are, was, have, do, etc.). The module uses pre-trained spaCy language model to extract semantic knowledge of each sentence in the text and then applies these rules on it to understand whether that sentence is a question 117 or not. Continuing with the example of 1001, the following questions 117 are determined: "Can you help me with something Can you please tell me my confirmation number Also could you help me access my account Can you please help me with all this."
1004: Question Identification: This module also extracts questions 117 from input text but focuses more on recall rather than precision. Training data has information in the form of whether a sentence is interrogative or not. Sentences in the training data are converted to contextual sentence embeddings where each sentence is represented by a vector and this information is used to train a classification model which predicts whether a sentence is interrogative in nature or not. For example, continuing with the example of 1003: "can you help me with something Can you please tell me my confirmation number Also, could you help me access my account If we have lost it permanently then what we can do is we can create a duplicate booking. Can you please help me with all this.
1005: Question Cleaning: Since data from different input channels like—calls, email, etc. can be used, this cleaning module can be used to clean the questions 117 that came out of extraction process. Question 117 sentences often come up with unwanted tokens, especially in the beginning, for example, the underlined portion of the following sentence: 'So, I am trying to understand why are we selling at this price?'. The following rules could be used to clean these types of questions 117. 1005.1: Rules for Question Cleaning: Find the starting point of one of the following POS tag patterns in the sentence and remove the text appearing before it. a. QW AUX DET, b. QW AUX ADJ, c. QW AUX NOUN, d. QW AUX PRON, e. QW AUX VERB, f. QW NOUN AUX, g. AUX PRON DET, h. AUX PRON VERB. QW: 5W-1H word (who, what, why, when, which, why). AUX: auxiliary verb/helping verb (is, are, was, have, do, etc.). ADJ: adjective. DET: determinant (a, an, the). NOUN: noun phrase. PRON: pronoun. VERB: verb (excluding auxiliary verbs). The purpose of this module is to remove all the unwanted tokens from the question 117 sentences that otherwise will not affect the semantic meaning of the sentence. This level of cleaning also helps in grouping similar question 117 pairs. For example, continuing with the example from 1004, the following is an output of 1005: "Can you help me with something Can you please tell me my confirmation number Could you help me access my account If we have lost it permanently then what we can do is that we can create a duplicate booking Can you please help me with all this."

1006 Question Filtering: This module uses a simple rule-based approach to funnel out all the potential no question sentences that might have come out of question 117 extraction process as false positives. 1006.1 Rules for Question Cleaning: If the POS patterns present in 1005.1 do not appear in the sentence, then that sentence is filtered out of the system, for example, continuing with the example from 1005, the output of 1006 could be: "Can you help me with something Can you please tell me my confirmation number Could you help me access my account Can you please help me with all this."

1007 Question Grouping: Once all the questions 117 have been extracted and cleaned from the text, a question grouping module is employed to group similar/duplicate questions 117. A classification model can be built to predict if a pair of questions 117 is similar or not using Quora question pair dataset. A pre-processing step can lemmatize the sentence, removing stop words/numbers from the sentences and synonym replacement. Synonym replacement step is where each token in the sentences is replaced with a master synonym word. Master word is a word which is a global representation of all its synonyms and is used to standardize the text. Pre-processing is done to remove unwanted information that might bring down a similarity score. After pre-processing, sentences are converted to vector forms using contextual sentence embeddings and these vectors are used to train a classification model to predict if two questions are similar/duplicate or not. Using this method, different clusters of questions 117 are created where each cluster contains similar questions 117. For example, continuing with the example from 1006, the output of 1007 could be "Can you help me with something Can you please tell me my confirmation number Could you help me access my account Can you please help me with all this."

Examples of Computer-Implemented Operations for Extracting Complaints from Feedback Data.

Figure 11:
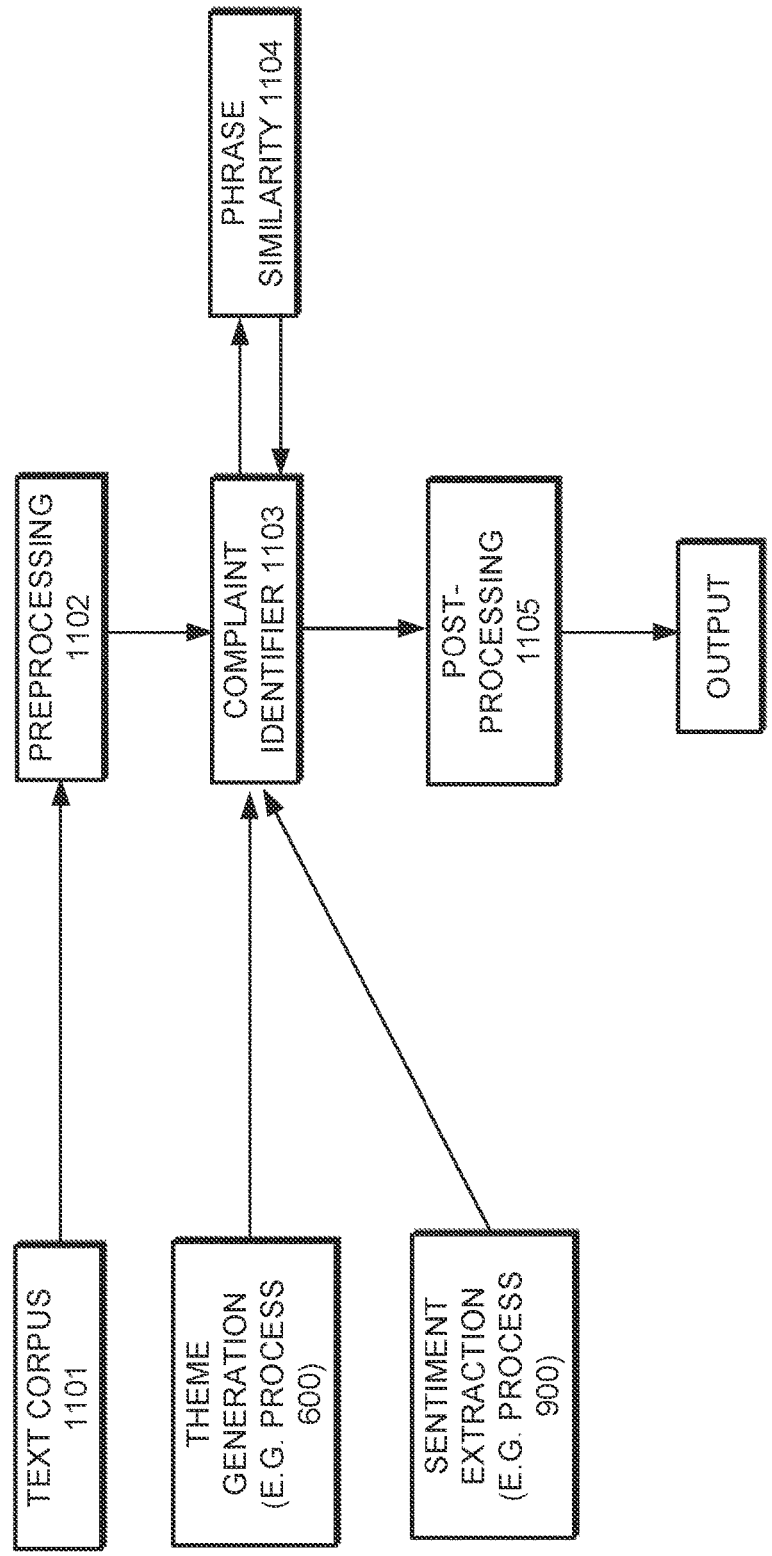
FIG. 11 depicts a method for generating a set of complaints for a feedback, according to certain embodiments disclosed herein.

FIG. 11 depicts an example of a complaint extraction process 1100, according to certain embodiments disclosed herein. One or more computing devices (e.g., the analytics system 120) implement operations depicted in FIG. 11. For illustrative purposes, the process 1100 is described with reference to certain examples depicted in the figures. Other implementations, however, are possible.

A complaint or grievance can be defined as some problem or pain point that the customer faced which dampened his/her experience. Customer complaint extractor module is an automated system to extract all the customer complaints and grievances from business-customer interactions and group similar complaints together for decision making. Complaints are important for business to understand the gaps in their service that the end user experienced and work upon to fill these gaps to create a positive outlook. Grouping similar complaints helps businesses to understand the gravity of the problem and prioritize their actions based on it. Outputs from theme generator subsystem 125 and sentiment extractor subsystem 124 can be used to create a rule-based model which would use syntactic knowledge to extract customer complaints and use semantic contextual knowledge to group similar complaints in a bucket.

A business or other entity can have thousands of customers, and there are multiple channels of communication like—calls, chat, email, survey forms, etc. which leads to a huge amount of text data being generated daily. It becomes very inefficient and redundant to go through each piece of text, read it and extract customer complaints in a scalable fashion. Moreover, grouping thousands of customer complaints into syntactic and semantically similar homogeneous groups is close to impossible for humans to do.

The following, as illustrated in FIG. 11, are different submodules: 1101: Text Corpus, 1102: Preprocessing, 1103: Complaint Identifier, 1104: Phrase Similarity, 1105: Postprocessing.

1101: Text Corpus: This is input to the system from which customer complaints are extracted. This input is a corpus of text, a csv file containing reviews or comments or verbatim from different sources.

1102: Pre-processing: This module makes the input text consistent and removes unwanted characters from the text. This block converts text into lower case, removes extra whitespaces/special characters and expands contractions.

1103: Complaint Identifier: This module packs a high precision system which: 1. Breaks input text into sentences, 2. Filters 'important sentences' using existing themes and sentiment metadata. Rules to filler important sentences: Hypothesis: Chances of getting complaint is higher in sentence with negative sentiment 114 and theme 115 metadata. A sentence present in a verbatim is termed as an 'important sentence' if its sentiment score<0.4 and one or more themes is present in the sentence. 3. Extracts syntactic metadata and uses certain rule-based heuristics to extract customer complaint phrases from these 'important sentences.' Rules to extract customer complaints: i. Find noun phrases (except pronouns) from the sentence, ii. Find POS tag information and dependency parser information for each sentence, iii. Get hold of each noun phrase in the sentence and go back to the verb or auxiliary, helping verb connected to that noun phrase to extract complaints [VERB AUX]. * NOUN, and iv. If the above pattern is found, then use dependency parser metadata to extract negation part (neg), adverb (advmod) and auxiliary verb (aux) connected with the VERB if present. Example: I can not make the reservation online. In this example, Step 3 extracts base complaint (make the reservation) and Step 4 extracts negation part (not), auxiliary verb (can) and adverb (online). The module uses pre-trained spaCy language model to extract syntactic knowledge of each sentence in the text.

1104: Phrase Similarity: This module works along with Complaint Extractor 1103 to extract customer complaint phrases. The job of this module is to cluster similar complaints together. It uses sentence transformers to extract semantic vector embedding of each complaint, we compute cosine similarity of the extracted embeddings with one another and use agglomerative clustering to group/form similar clusters where each cluster is represented by the most frequent complaint.

1105: Post-processing: This module takes the extracted complaint as input and converts parts of speech from 1st person to 3rd person. Example: can not access my account→can not access their account.

Examples of Computing Environments for Implementing Certain Embodiments.

Figure 12:
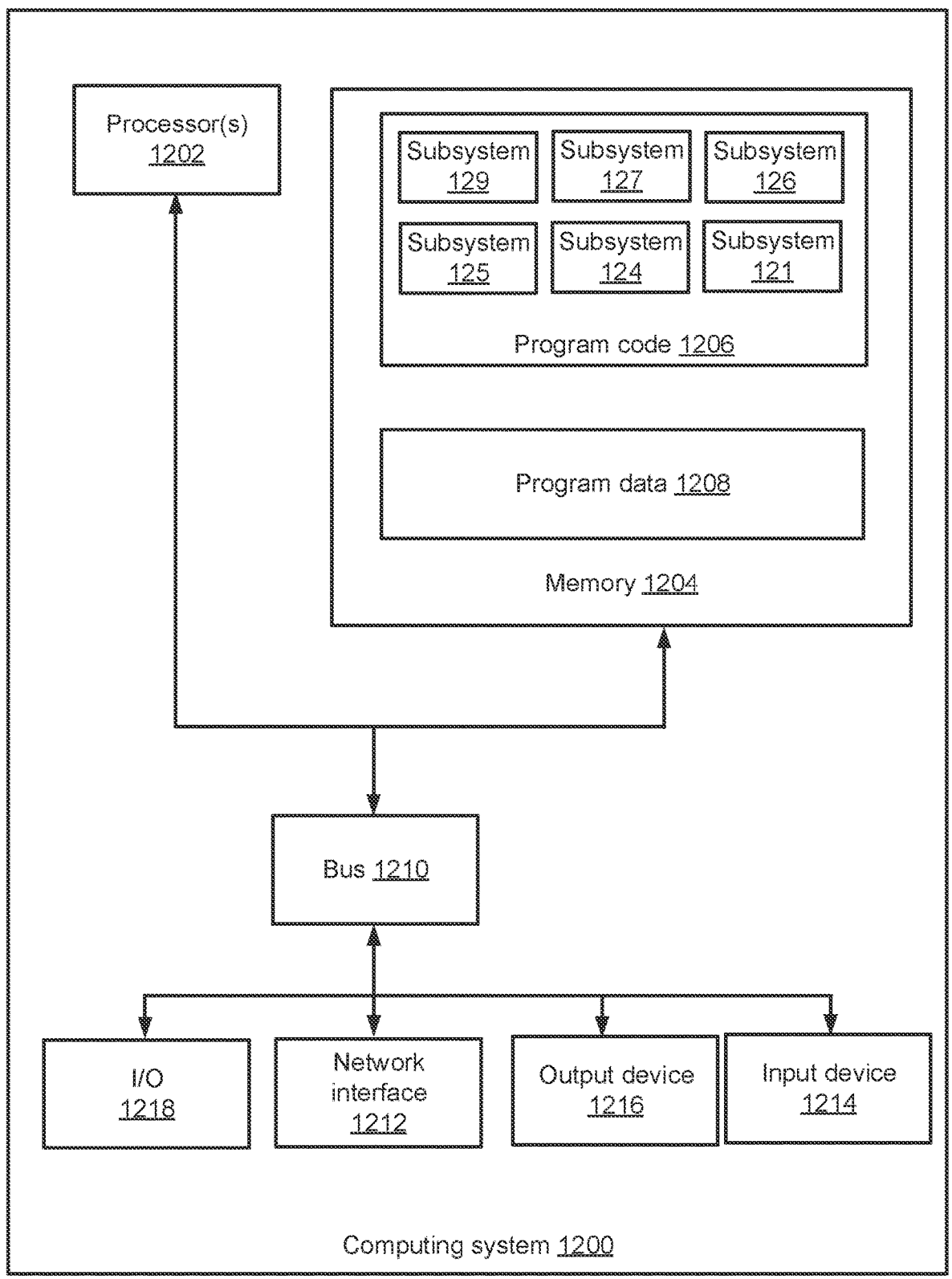
FIG. 12 depicts an example of a computing system that performs certain operations described herein, according to certain embodiments described in the present disclosure.

Any suitable computer system or group of computer systems can be used for performing the operations described herein. For example, FIG. 12 depicts an example of a computer system 1200. The depicted example of the computer system 1200 includes a processor 1202 communicatively coupled to one or more memory devices 1204. The processor 1202 executes computer-executable program code stored in a memory device 1204, accesses information stored in the memory device 1204, or both. Examples of the processor 1202 include a microprocessor, an application-specific integrated circuit ("ASIC"), a field-programmable gate array ("FPGA"), or any other suitable processing device. The processor 1202 can include any number of processing devices, including a single processing device.

The memory device 1204 includes any suitable non-transitory computer-readable medium for storing program code 1206, program data 1208, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the memory device 404 can be volatile memory, non-volatile memory, or a combination thereof.

The computer system 1200 executes program code 1206 that configures the processor 1202 to perform one or more of the operations described herein. Examples of the program code 1206 include, in various embodiments, the analytics system 120 and subsystems thereof (including subsystems 121, 124, 125, 126, 127, 129) of FIG. 1, which may include any other suitable systems or subsystems that perform one or more operations described herein (e.g., one or more neural networks, encoders, attention propagation subsystem and segmentation subsystem). The program code 1206 may be resident in the memory device 1204 or any suitable computer-readable medium and may be executed by the processor 1202 or any other suitable processor.

The processor 1202 is an integrated circuit device that can execute the program code 1206. The program code 1206 can be for executing an operating system, an application system or subsystem, or both. When executed by the processor 1202, the instructions cause the processor 1202 to perform operations of the program code 1206. When being executed by the processor 1202, the instructions are stored in a system memory, possibly along with data being operated on by the instructions. The system memory can be a volatile memory storage type, such as a Random Access Memory (RAM) type. The system memory is sometimes referred to as Dynamic RAM (DRAM) though need not be implemented using a DRAM-based technology. Additionally, the system memory can be implemented using non-volatile memory types, such as flash memory.

In some embodiments, one or more memory devices 1204 store the program data 1208 that includes one or more datasets described herein. In some embodiments, one or more of data sets are stored in the same memory device (e.g., one of the memory devices 1204). In additional or alternative embodiments, one or more of the programs, data sets, models, and functions described herein are stored in different memory devices 1204 accessible via a data network. One or more buses 1210 are also included in the computer system 1200. The buses 1210 communicatively couple one or more components of a respective one of the computer system 1200.

In some embodiments, the computer system 1200 also includes a network interface device 1212. The network interface device 1212 includes any device or group of devices suitable for establishing a wired or wireless data connection to one or more data networks. Non-limiting examples of the network interface device 1212 include an Ethernet network adapter, a modem, and/or the like. The computer system 1200 is able to communicate with one or more other computing devices via a data network using the network interface device 1212.

The computer system 1200 may also include a number of external or internal devices, an input device 1214, a presentation device 1216, or other input or output devices. For example, the computer system 1200 is shown with one or more input/output ("I/O") interfaces 1218. An I/O interface 1218 can receive input from input devices or provide output to output devices. An input device 1214 can include any device or group of devices suitable for receiving visual, auditory, or other suitable input that controls or affects the operations of the processor 1202. Non-limiting examples of the input device 1214 include a touchscreen, a mouse, a keyboard, a microphone, a separate mobile computing device, etc. A presentation device 1216 can include any device or group of devices suitable for providing visual, auditory, or other suitable sensory output. Non-limiting examples of the presentation device 1216 include a touchscreen, a monitor, a speaker, a separate mobile computing device, etc.

Although FIG. 12 depicts the input device 1214 and the presentation device 1216 as being local to the computer system 1200, other implementations are possible. For instance, in some embodiments, one or more of the input device 1214 and the presentation device 1216 can include a remote client-computing device that communicates with computing system 1200 via the network interface device 1212 using one or more data networks described herein.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computer systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Figure 13:
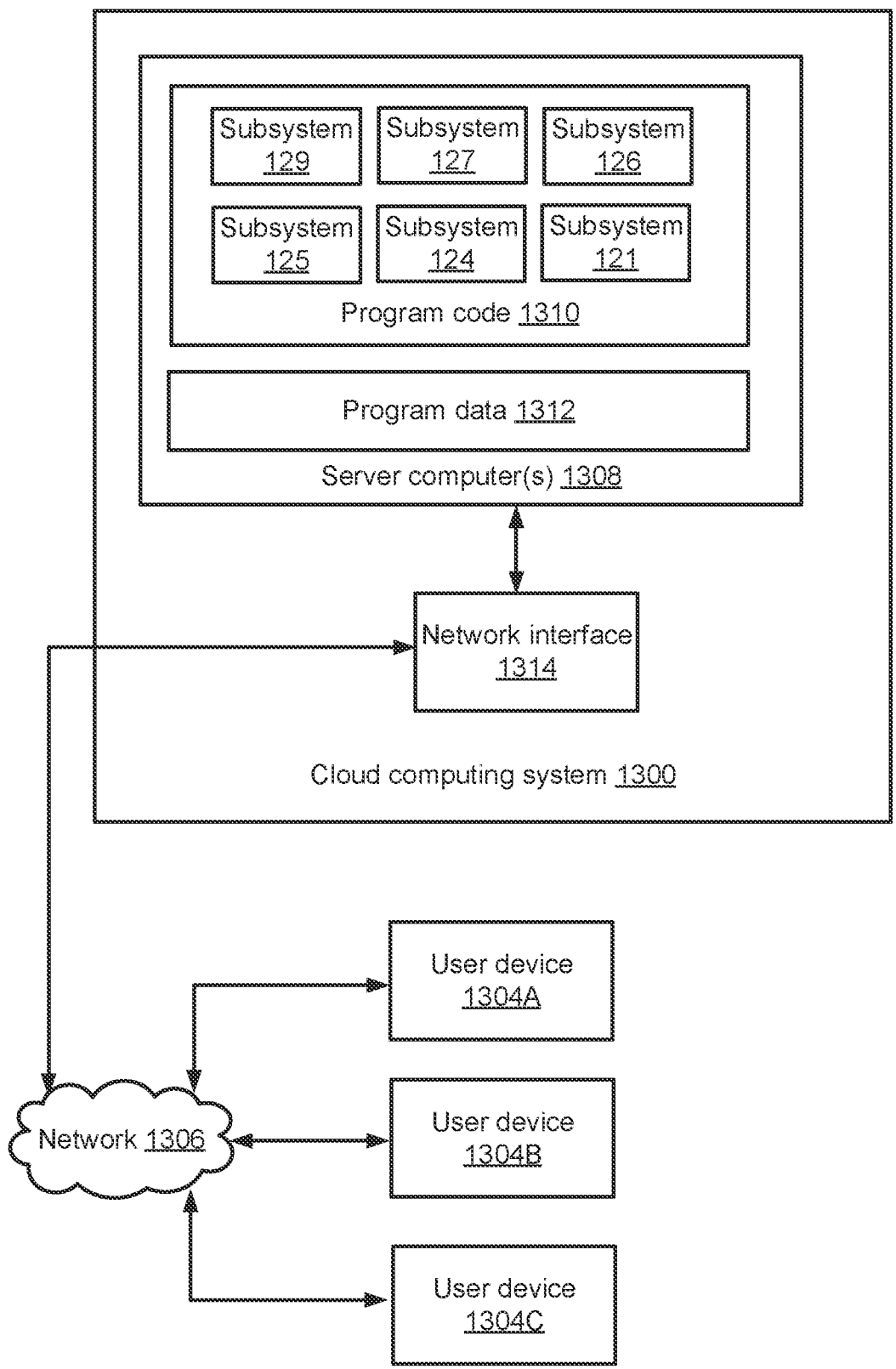
FIG. 13 depicts an example of a cloud computing system that performs certain operations described herein, according to certain embodiments described in the present disclosure.

In some embodiments, the functionality provided by computer system 1200 may be offered as cloud services by a cloud service provider. For example, FIG. 13 depicts an example of a cloud computer system 1300 offering a service for generating a presentation 119 based on a feedback 132 for an entity be used by a number of user subscribers using user devices 1304A, 1304B, and 1304C across a data network 1306. In the example, the service for generating a presentation 119 based on a feedback 132 for an entity may be offered under a Software as a Service (SaaS) model. One or more users may subscribe to the service for generating a presentation 119 based on a feedback 132 for an entity, and the cloud computer system 1300 performs the processing to provide the service for generating a presentation 119 based on a feedback 132 for an entity to subscribers. The cloud computer system 1300 may include one or more remote server computers 1308.

The remote server computers 1308 include any suitable non-transitory computer-readable medium for storing program code 1310 (e.g., the analytics system 120 and subsystems 121, 124, 125, 126, 127, 129 thereof of FIG. 1) and program data 1312, or both, which is used by the cloud computer system 800 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 1308 can include volatile memory, non-volatile memory, or a combination thereof.

One or more of the server computers 808 execute the program code 1310 that configures one or more processors of the server computers 1308 to perform one or more of the operations that provide presentation 119 generation services. As depicted in the embodiment in FIG. 13, the one or more servers providing the services for generating a presentation 119 based on a feedback 132 for an entity may implement the analytics system 120 and the subsystems 121, 124, 125, 126, 127, 129 thereof. Any other suitable systems or subsystems that perform one or more operations described herein (e.g., one or more development systems for configuring an interactive user interface) can also be implemented by the cloud computer system 1300.

In certain embodiments, the cloud computer system 1300 may implement the services by executing program code and/or using program data 1312, which may be resident in a memory device of the server computers 1308 or any suitable computer-readable medium and may be executed by the processors of the server computers 808 or any other suitable processor.

In some embodiments, the program data 1312 includes one or more datasets and models described herein. In some embodiments, one or more of data sets, models, and functions are stored in the same memory device. In additional or alternative embodiments, one or more of the programs, data sets, models, and functions described herein are stored in different memory devices accessible via the data network 1306.

The cloud computer system 1300 also includes a network interface device 1314 that enable communications to and from cloud computer system 1300. In certain embodiments, the network interface device 1314 includes any device or group of devices suitable for establishing a wired or wireless data connection to the data networks 1306. Non-limiting examples of the network interface device 1314 include an Ethernet network adapter, a modem, and/or the like. The presentation 119 generation service is able to communicate with the user devices 1304A, 1304B, and 1304C via the data network 1306 using the network interface device 1314.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included within the scope of claimed embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computer system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as an open and inclusive language that does not foreclose devices adapted to or configured to perform additional tasks or steps. Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Additionally, the use of "based on" is meant to be open and inclusive, in that, a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A computer-implemented method in which one or more processing devices perform operations comprising:
   receiving, from a client computing device, a request to generate a presentation;
   accessing one or more feedback datasets of feedback data, the feedback data comprising unstructured data available from multiple data stores;
   generating, for each feedback dataset, a respective feedback text and a respective sentiment score indicating a degree of negativity associated with the respective feedback text;
   for a combination of a plurality of generated feedback texts, selecting a set of themes based at least on a plurality of generated sentiment scores, wherein each sentiment score of the plurality of generated sentiment scores is associated with one of the plurality of generated feedback texts, wherein the theme selection comprises:
      extracting a set of phrases from the combination of the plurality of generated feedback texts;
      applying a phrase normalization process to the set of phrases to generate a distribution of normalized phrases, wherein the phrase normalization process comprises:
         applying a language model to each of the phrases to generate a respective phrase embedding; and
         determining a group of phrases having similar phrase embeddings and removing phrases from the group except for a representative phrase for the group, the representative phrase determined by:
            ranking the group of phrases according to a character length of the respective phrases; and
            selecting a longest of the ranked group of phrases as the representative phrase for the group; and
      selecting the set of themes from the normalized phrases;
   generating a presentation file that indicates the set of themes; and
   causing the presentation file to be transmitted to the client computing device.

2. The computer-implemented method of claim 1, the operations further comprising:
   determining a theme score for each of the themes based on one or more of a part of speech pattern, a location of the theme within its respective feedback text, and a number of similar themes associated with the respective theme; and
   ranking the themes according to theme score.

3. The computer-implemented method of claim 1, wherein selecting the set of themes from the normalized phrases comprises:
   ranking each normalized phrase of the distribution of normalized phrases according to the sentiment score of the feedback text from which the normalized phrase is determined; and
   selecting a set of normalized phrases having sentiment scores indicating a greatest degree of negativity.

4. The computer-implemented method of claim 1, wherein the theme selection further comprises applying a noise removal process to generate, from the set of phrases, a reduced set of phrases, wherein the phrase normalization process is applied to the reduced set of phrases.

5. The computer-implemented method of claim 4, wherein the noise removal process includes determining an inverse document frequency (IDF) for each phrase of the set of phrases and removing phrases having an IDF of less than a threshold IDF.

6. The computer-implemented method of claim 1, wherein the theme selection further comprises:
   generating a ranked list of themes by ranking the normalized phrases based at least in part on the respective sentiment score associated with the respective feedback text from which the normalized phrase is determined, wherein selecting the set of themes from the normalized phrases comprises selecting a predefined number of top-ranked themes from the ranked list of themes.

7. The computer-implemented method of claim 1, wherein the phrase normalization process further comprises:

removing, except for the representative phrase, phrases associated with a group of phrase embeddings having a common root form.

8. The computer-implemented method of claim 1, further comprising, for the combination of the plurality of generated feedback texts, generating a set of actionable insights including one or more issues an entity can improve or otherwise address by taking action and a set of questions.

9. The computer-implemented method of claim 8,
wherein the request indicates a presentation template to present one or more combinations of theme information, actionable insights information, and question information; and
wherein the presentation file includes one or more combinations of the themes, actionable insights, and questions according to the presentation template.

10. A system comprising:
a processor; and
a non-transitory computer readable medium storing computer-readable program instructions that, when executed by the processor, cause the system to:
 receive, from a client computing device, a request to generate a presentation;
 access one or more feedback datasets of feedback data, the feedback data comprising unstructured data available from multiple data stores;
 generate, for each feedback dataset, a respective feedback text and a respective sentiment score indicating a degree of negativity associated with the respective feedback text;
 for a combination of a plurality of generated feedback texts, select a set of themes based at least on a plurality of generated sentiment scores, wherein each sentiment score of the plurality of generated sentiment scores is associated with one of the plurality of generated feedback texts, wherein the theme selection comprises:
  extract a set of phrases from the combination of the plurality of generated feedback texts;
  apply a phrase normalization process to the set of phrases to generate a distribution of normalized phrases, wherein the phrase normalization process comprises:
   apply a language model to each of the phrases to generate a respective phrase embedding; and
   determine a group of phrases having similar phrase embeddings and removing phrases from the group except for a representative phrase for the group, the representative phrase determined by:
    rank the group of phrases according to a character length of the respective phrases; and
    select a longest of the ranked group of phrases as the representative phrase for the group; and
  select the set of themes from the normalized phrases;
 generate a presentation file that indicates the set of themes; and
 cause the presentation file to be transmitted to the client computing device.

11. The system of claim 10, the non-transitory computer readable medium further storing computer-readable program instructions that, when executed by the processor, cause the system to:
 determine a theme score for each of the themes based on one or more of a part of speech pattern, a location of the theme within its respective feedback text, and a number of similar themes associated with the respective theme; and
 rank the themes according to theme score.

12. The system of claim 10, wherein selecting the set of themes from the normalized phrases comprises:
 ranking each normalized phrase of the distribution of normalized phrases according to the sentiment score of the feedback text from which the normalized phrase is determined; and
 selecting a set of normalized phrases having sentiment scores indicating a greatest degree of negativity.

13. A non-transitory computer-readable medium having program code that is stored thereon, the program code executable by one or more processing devices for performing operations comprising:
 receiving, from a client computing device, a request to generate a presentation;
 accessing one or more feedback datasets of feedback data, the feedback data comprising unstructured data available from multiple data stores;
 generating, for each feedback dataset, a respective feedback text and a respective sentiment score indicating a degree of negativity associated with the respective feedback text;
 for a combination of a plurality of generated feedback texts, selecting a set of themes based at least on a plurality of generated sentiment scores, wherein each sentiment score of the plurality of generated sentiment scores is associated with one of the plurality of generated feedback texts, wherein the theme selection comprises:
  extracting a set of phrases from the combination of the plurality of generated feedback texts;
  applying a phrase normalization process to the set of phrases to generate a distribution of normalized phrases, wherein the phrase normalization process comprises:
   applying a language model to each of the phrases to generate a respective phrase embedding; and
   determining a group of phrases having similar phrase embeddings and removing phrases from the group except for a representative phrase for the group, the representative phrase determined by:
    ranking the group of phrases according to a character length of the respective phrases; and
    selecting a longest of the ranked group of phrases as the representative phrase for the group; and
  selecting the set of themes from the normalized phrases;
 generating a presentation file that indicates the set of themes; and
 causing the presentation file to be transmitted to the client computing device.

14. The non-transitory computer-readable medium of claim 13, the operations further comprising:
 determining a theme score for each of the themes based on one or more of a part of speech pattern, a location of the theme within its respective feedback text, and a number of similar themes associated with the respective theme; and
 ranking the themes according to theme score.

15. The non-transitory computer-readable medium of claim 13, wherein the theme selection further comprises generating a ranked list of themes by ranking the normalized phrases based at least in part on the respective sentiment score associated with the respective feedback text from which the normalized phrase is determined, wherein selecting the set of themes from the normalized phrases comprises selecting a predefined number of top-ranked themes from the ranked list of themes.

* * * * *